United States Patent
Um et al.

(10) Patent No.: US 10,296,072 B2
(45) Date of Patent: May 21, 2019

(54) METHOD AND APPARATUS FOR REDUCING POWER CONSUMPTION BASED ON USE PATTERN OF USER

(71) Applicant: Samsung Electronics Co., Ltd., Suwon-si, Gyeonggi-do (KR)

(72) Inventors: Tae-kwang Um, Suwon-si (KR); Du-seok Kim, Yongin-si (KR); Hyun-cheol Park, Suwon-si (KR); Ho-sik Cho, Suwon-si (KR); Cheol-ju Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/017,069

(22) Filed: Feb. 5, 2016

(65) Prior Publication Data
US 2016/0239069 A1    Aug. 18, 2016

(30) Foreign Application Priority Data
Feb. 13, 2015 (KR) .................. 10-2015-0022718

(51) Int. Cl.
*G06F 1/32* (2019.01)
*G06F 1/329* (2019.01)
*G06F 1/3228* (2019.01)
*G06F 1/3231* (2019.01)

(52) U.S. Cl.
CPC ............ *G06F 1/329* (2013.01); *G06F 1/3228* (2013.01); *G06F 1/3231* (2013.01); *Y02D 10/173* (2018.01); *Y02D 10/24* (2018.01)

(58) Field of Classification Search
CPC .................. G06F 1/329; G06F 1/3228
USPC .......................................... 455/574
See application file for complete search history.

(56) References Cited

U.S. PATENT DOCUMENTS

| 9,714,963 B2* | 7/2017 | Andreoli | G01R 21/133 |
| 2007/0037609 A1* | 2/2007 | Zhang | H04W 52/0232 455/574 |
| 2007/0288777 A1* | 12/2007 | Schutte | G06F 1/206 713/320 |
| 2008/0126282 A1 | 5/2008 | Sinclair et al. | |

(Continued)

FOREIGN PATENT DOCUMENTS

| KR | 10-2011-0097605 A | 8/2011 |
| KR | 10-2013-0013714 A | 2/2013 |

(Continued)

*Primary Examiner* — Marcus Hammonds
(74) *Attorney, Agent, or Firm* — Jefferson IP Law, LLP

(57) ABSTRACT

A device and method of managing power are provided. The device includes a user input unit configured to receive a user input from a user, an output unit configured to output information based on the user input, and a controller configured to, when the user input is not received, determine whether or not an out-focus status in which the user does not use the device has started, determine, when it is determined that the out-focus status has started, a period in which the out-focus status is to be maintained based on information about a probability of the out-focus status according to a context of the device, and stop, when the period in which the out-focus status is to be maintained is equal to or greater than a reference time period, an application executed in the device.

18 Claims, 37 Drawing Sheets

(56) References Cited

U.S. PATENT DOCUMENTS

| | | | | |
|---|---|---|---|---|
| 2011/0177847 A1* | 7/2011 | Huang | ............. | H04W 52/0216 |
| | | | | 455/574 |
| 2011/0207449 A1 | 8/2011 | Shin et al. | | |
| 2011/0319064 A1* | 12/2011 | Lenart | ............... | H04W 52/0225 |
| | | | | 455/418 |
| 2012/0064948 A1* | 3/2012 | Lee | ........................ | H04M 1/67 |
| | | | | 455/566 |
| 2012/0280917 A1* | 11/2012 | Toksvig | ................ | G06F 1/1626 |
| | | | | 345/173 |
| 2012/0315960 A1 | 12/2012 | Kim | | |
| 2013/0222285 A1 | 8/2013 | Lee et al. | | |

FOREIGN PATENT DOCUMENTS

| | | |
|---|---|---|
| WO | 2008/110877 A1 | 9/2008 |
| WO | 2012/036324 A1 | 3/2012 |
| WO | 2013/130214 A1 | 9/2013 |

\* cited by examiner

FIG. 4A

| SCREEN (SLEEP MODE) | OCCURRENCE OF MISSED CALL | OCCURRENCE OF MISSED MESSAGE | STRENGTH OF WIRELESS SIGNAL WITH RESPECT TO WEARABLE DEVICE IS DECREASED | WHETHER APPLICATION FOR OUTPUTTING DATA TO USER OR APPLICATION FOR RECEIVING USER'S DATA INPUT IS EXECUTED (EX. MUSIC, VIDEO REPRODUCTION, VOICE RECORDING, TETHERING, DATA EXCHANGE WITH PC) | OUT-FOCUS STATUS |
|---|---|---|---|---|---|
| OFF(trigger) | Don't care | Don't care | Don't care | X | START |
| Don't care | O(trigger) | Don't care | Don't care | X | START |
| Don't care | Don't care | O(trigger) | Don't care | X | START |
| Don't care | Don't care | Don't care | O(trigger) | Don't care | START |

FIG. 5

| RECEPTION OF PHYSICAL INPUT | OUT-FOCUS STATUS |
|---|---|
| O(trigger) | END |
| Don't care | END |

FIG. 7

| TIME | LOCATION | APPLICATION EXECUTION INFORMATION | | EVENT REACTION INFORMATION | DEVICE STATUS | | | | | SURROUNDING ENVIRONMENT OF DEVICE | |
|---|---|---|---|---|---|---|---|---|---|---|---|
| | | IDENTIFICATION INFORMATION | ENTRY PATH | | EARPHONES | WEARABLE DEVICE | NETWORK IP | BATTERY CONSUMPTION /MM | BATTERY CHARGING | ILLUMINANCE | NOISE |
| ... | ... | ... | ... | ... | ... | ... | ... | ... | ... | ... | ... |
| 2014/11/17 /17:22 | N50°70'90" E111°11'73" | START OF WEB BROWSER | SELECTION OF ICON | | | | 112.113. 114.115 | 30mA | | 200lux | 100dB |
| 2014/11/17 /17:45 | N50°70'90" E111°11'72" | END OF WEB BROWSER | | | | | | | | | |
| 2014/11/17 /18:20 | N50°70'90" E111°11'74" | | | MESSAGE MISSED | | | | | | 100lux | 70dB |
| 2014/11/17 /18:34 | N50°70'90" E111°11'75" | | | CALL RECEIVED | | | | | | | |
| 2014/11/17 /18:50 | N50°70'90" E111°11'76" | | | | CONNECTION | | | | | | |
| 2014/11/17 /18:50 | N50°70'91" E111°11'77" | START OF MUSIC REPRODUCING APP | SELECTION OF ICON | | | CONNECTION OF WATCH | 122.123. 124.125 | 50mA | | 150lux | 75dB |
| 2014/11/17 /19:34 | N50°70'92" E111°11'77" | START OF SNS APP | SELECTION OF PUSH NOTICE POP-UP | | | | | 60mA | | | |
| 2014/11/17 /19:35 | N50°70'93" E111°11'75" | | | | | | | | START | 130lux | |
| ... | ... | ... | ... | ... | ... | ... | ... | ... | ... | ... | ... |

FIG. 19

| MODE | PERIOD IN WHICH OUT-FOCUS STATUS IS TO BE MAINTAINED | CONTROL OF DATA EXCHANGE OF BACKGROUND APPLICATION |
|---|---|---|
| MODE 0 | 5 MINUTES | NO LIMIT |
| MODE 1 | 30 MINUTES | NETWORK CONTROL FOR CYCLE OF 5 MINUTES-OFF AND 1 MINUTE-ON |
| MODE 2 | 5 HOURS | NETWORK CONTROL FOR CYCLE OF 25 MINUTES-OFF AND 1 MINUTE-ON |

FIG. 20

| | RELIABILITY 60 – 70 % | RELIABILITY 70 – 80 % | RELIABILITY 80 – 99 % |
|---|---|---|---|
| RANGE OF APPLICATION FOR WHICH DATA SYNC OR UPDATE IS LIMITED | APPLICATION WHOSE NUMBER OF TIMES OF EXECUTION IS BELOW LOW 20% | APPLICATION WHOSE NUMBER OF TIMES OF EXECUTION IS BELOW LOW 50% | APPLICATION WHOSE NUMBER OF TIMES OF EXECUTION IS BELOW LOW 80% |

METHOD AND APPARATUS FOR REDUCING POWER CONSUMPTION BASED ON USE PATTERN OF USER

CROSS-REFERENCE TO RELATED APPLICATION(S)

This application claims the benefit under 35 U.S.C. § 119(a) of a Korean patent application filed on Feb. 13, 2015 in the Korean Intellectual Property Office and assigned Serial number 10-2015-0022718, the entire disclosure of which is hereby incorporated by reference.

TECHNICAL FIELD

The present disclosure relates to methods and apparatuses for improving efficiency of power consumption of a battery of a device, based on a use pattern of a user with respect to the device.

BACKGROUND

Currently, functions of a device have become increasingly complex and diverse and thus, power consumption of the device is increased, whereas a size of the device is reduced. Also, the number of portable devices has increased, whereas a size of a battery in each device is decreased. Therefore, there is an increasing demand for improving efficiency of power consumption of a battery of a device.

In order to reduce power consumption of a battery, a low-power hardware chipset may be used or an operating voltage of a device may be decreased. Also, hardware of the device may be integrated in the form of a system on chip (SoC). However, since these physical attempts have limitations in reducing the power consumption, it is required to reduce the power consumption by intelligently controlling operations of the device by using a difference between a use pattern of the device of a user and a use pattern of another device of another user.

The above information is presented as background information only, to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and provide at least the advantages described below. Accordingly, an aspect of the present disclosure is to provide methods and apparatuses for improving efficiency of power consumption of a battery of a device, based on a use pattern of a user with respect to the device.

In accordance with an aspect of the present disclosure, a device is provided. The device includes a user input unit configured to receive a user input from a user, an output unit configured to output information based on the user input, and a controller configured to determine, when the user input is not received, whether or not an out-focus status in which the user does not use the device has started, determine, when it is determined that the out-focus status has started, a period in which the out-focus status is to be maintained based on information about a probability of the out-focus status according to a context of the device, and stop, when the period in which the out-focus status is to be maintained is equal to or greater than a reference time period, an application executed in the device.

In accordance with another aspect of the present disclosure, a method of managing power is provided. The method of managing power includes determining, when a user input is not received from a user, whether or not an out-focus status in which the user does not use a device has started, determining, when it is determined that the out-focus status has started, a period in which the out-focus status is to be maintained based on information about a probability of the out-focus status according to a context of the device, and stopping, when the period in which the out-focus status is to be maintained is equal to or greater than a reference time period, an operation of an application executed in the device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A and 4B illustrate diagrams in relation to a method of determining that an out-focus status has started, according to various embodiments of the present disclosure;

FIG. 5 illustrates a table related to a method of determining an end of an out-focus status, according to an embodiment of the present disclosure;

FIG. 7 illustrates device use pattern information of a user according to an embodiment of the present disclosure;

FIG. 19 illustrates a table related to a method of controlling an operation of a background application, according to an embodiment of the present disclosure;

FIG. 20 illustrates a table related to a method of stopping an operation of an application according to reliability of a period in which an out-focus status is to be maintained, according to an embodiment of the present disclosure;

Throughout the drawings, like reference numerals will be understood to refer to like parts, components, and structures.

DETAILED DESCRIPTION

Figure 1:
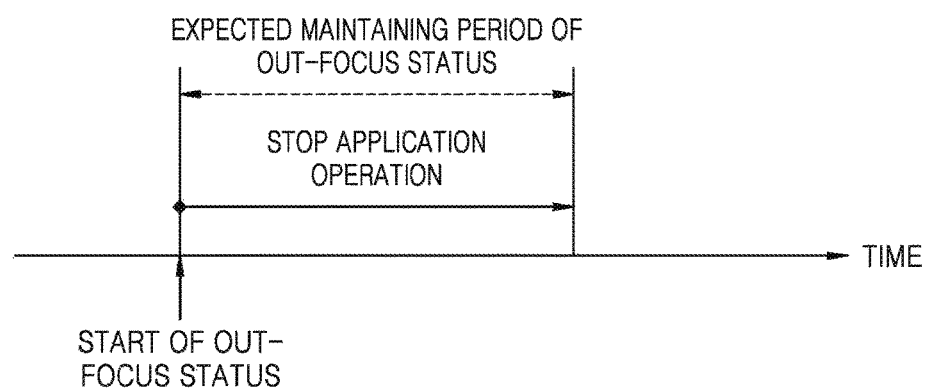
FIG. 1 is a diagram illustrating a method of efficiently controlling power consumption of a battery of a device, based on a period in which an out-focus status of the device is to be maintained, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

Throughout the specification, the term "out-focus status" may mean a status in which a user does not use a device. For example, the out-focus status may indicate a status in which the device does not output information, according to non-reception of a user input. Also, the out-focus status may indicate a status in which, even if the device outputs information, the user does not receive the output information. In an embodiment, the term "out-focus status" may be referred to as "non-use status" or "out-of-coverage status".

Throughout the specification, the term "context of a device" may correspond to information indicating a status of the device. For example, the context of the device may include, but is not limited to, a time, a location of the device, a status of the device, and a surrounding environment of the device.

One or more embodiments will now be described more fully with reference to the accompanying drawings. However, the one or more embodiments may be embodied in many different forms, and should not be construed as being limited to the embodiments set forth herein; rather, these embodiments are provided so that this disclosure will be thorough and complete, and will fully convey the concept of the one or more embodiments to those of ordinary skill in the art.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating a method of efficiently controlling power consumption of a battery of a device based on a period in which an out-focus status of the device is to be maintained, according to an embodiment of the present disclosure.

Figure 26:
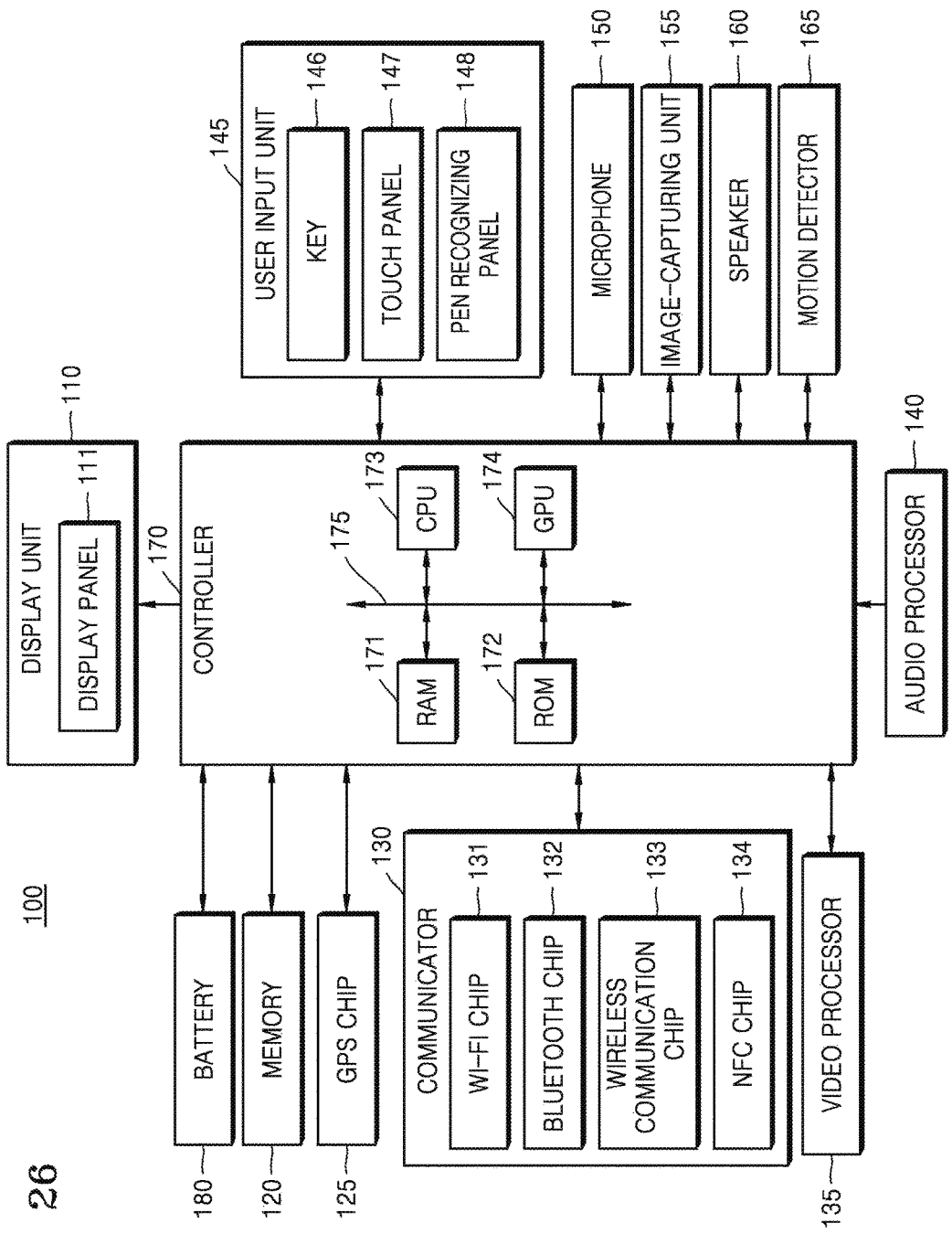
FIG. 26 is a block diagram illustrating a device according to an embodiment of the present disclosure.

FIG. 26 illustrates a block diagram of a device according to an embodiment of the present disclosure.

Referring to FIGS. 1 and 26, a device 100 may calculate a probability of a user having an out-focus status with respect to the device 100, and may improve efficiency of power consumption of a battery 180 of the device 100 based on the calculated probability with respect to the out-focus status.

The out-focus status may mean a status in which the user does not use the device 100. Also, throughout the specification, a probability of the out-focus status may be referred to as an out-focus probability.

The device 100 may determine a start or end of the out-focus status. For example, when a user input is not received and thus a screen of the device 100 is turned off, the device 100 may determine that the out-focus status has started. As another example, when a strength of a short-distance wireless signal between the device 100 and a wearable device becomes equal to or less than a reference strength, the device 100 may determine that the out-focus status has started.

When the device 100 determines that the out-focus status has been started, the device 100 may determine a period in which the out-focus status is to be maintained and reliability of the period, based on an out-focus probability according to a context of the device 100. The context of the device 100 may include, but is not limited to, a time, a location of the device 100, a status of the device 100, and a surrounding environment of the device 100.

The out-focus probability according to the context of the device 100 may be previously calculated by the device 100. For example, based on device use pattern information of the user during a preset time period, the device 100 may calculate the out-focus probability according to the time, a place of the device 100, a status of the device 100, or a surrounding environment of the device 100.

When the context of the device 100 is changed, the device 100 may determine a period in which an out-focus status is to be maintained and reliability of the period, based on an out-focus probability corresponding to a changed context.

Based on the period in which the out-focus status is to be maintained and the reliability of the period in which the out-focus status is to be maintained, the device 100 may stop an operation of an executed application and thus may improve efficiency of the power consumption.

For example, in a case where the period in which the out-focus status is to be maintained is equal to or greater than a reference time and the reliability is equal to or greater than a reference value, the device 100 may stop data exchange between an external server and a background processor of the device 100 and thus may reduce the power consumption of the battery. As another example, the device 100 may block an update of an application and thus may reduce the power consumption of the battery. As another example, even if the device 100 receives push data from an external server, the device 100 may not notify the user and thus may reduce the power consumption of the battery.

As another example, the device 100 may recommend the user for an application having a high execution number of times, based on an execution number of times of applications according to the context of the device 100. Accordingly, the device 100 may decrease a user's touch input to execute an application and thus may reduce the power consumption of the battery.

Figure 2:
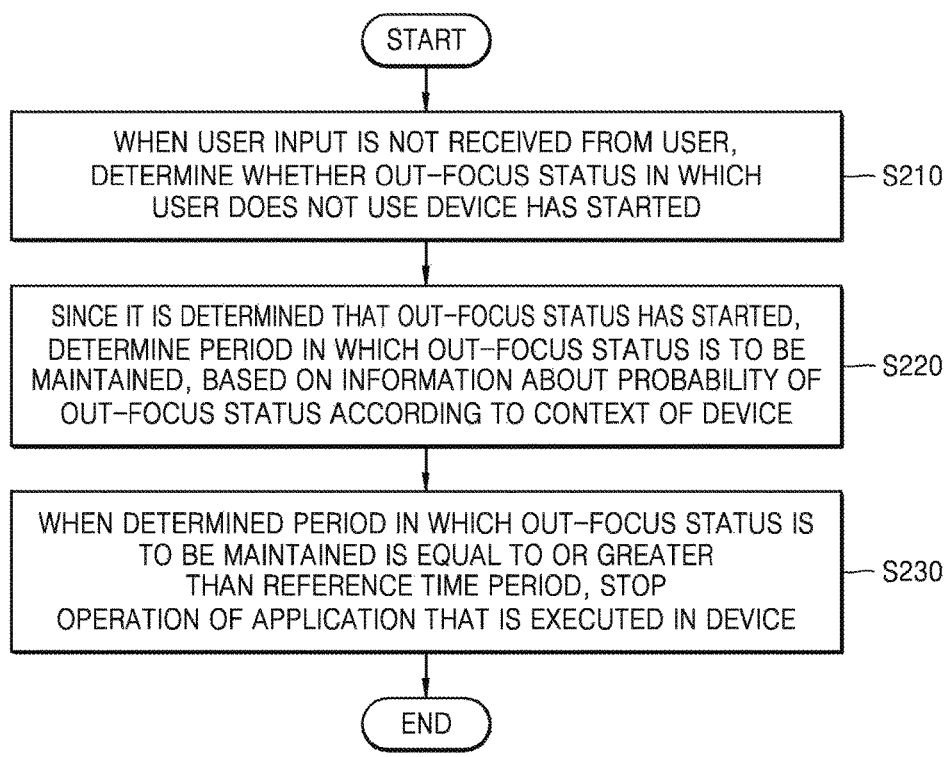
FIG. 2 is a flowchart illustrating a method of controlling an operation of an application based on an out-focus probability, according to an embodiment of the present disclosure.

FIG. 2 is a flowchart illustrating a method of controlling an operation of an application based on an out-focus probability, the method being performed by a device, according to an embodiment of the present disclosure.

Referring to FIG. 2, in operation S210, when a user input is not received from a user, a device 100 may determine whether an out-focus status in which the user does not use the device 100 has started.

When the user input is not received from the user for a preset time period, the device 100 may inactivate a display unit (not shown) of the device 100. When the display unit of the device 100 is inactivated, i.e., when a screen of the device 100 is turned off, the device 100 may determine that the out-focus status has started. In an embodiment, when an operation mode of the device 100 is changed to a sleep mode or a power saving mode, the device 100 may determine that the out-focus status has started.

While an image or sound to notify the user about reception of a call connection request is output, if a user input for call connection is not received, the device 100 may determine that the out-focus status has started.

After an image or sound to notify the user about reception of a message is output, if a user input for checking the message is not received within a preset time period, the device 100 may determine that the out-focus status has started.

While the device 100 communicates with a wearable device, if a strength of a short-distance wireless signal between the device 100 and the wearable device becomes equal to or less than a reference strength, the device 100 may determine that the out-focus status has started.

In operation S220, since the device 100 determined that the out-focus status started, the device 100 may determine a period in which the out-focus status is to be maintained based on information about a probability of the out-focus status according to a context of the device 100.

The context of the device 100 may include, but is not limited to, a time, a location of the device 100, a status of the device 100, and a surrounding environment of the device 100.

For example, based on an out-focus probability according to the time, the device 100 may calculate the period in which the out-focus status is to be maintained from a start of the out-focus status.

In operation S230, when the calculated period in which the out-focus status is to be maintained is equal to or greater than a reference time period, the device 100 may stop an operation of an application that is executed in the device 100.

Based on the out-focus probability of the period in which the out-focus status is to be maintained from the start of the out-focus status, the device 100 may determine reliability of the period in which the out-focus status is to be maintained. Only when the determined reliability of the period in which the out-focus status is to be maintained is equal to or greater than a reference, the device 100 may stop the operation of the application that is executed in the device 100.

In this case, the device 100 may further consider an out-focus probability with respect to a location of the device 100 at the start of the out-focus status, and may determine the reliability of the period in which the out-focus status is to be maintained.

In this case, the device 100 may further consider an out-focus probability with respect to a status of the device 100 at the start of the out-focus status, and may determine the reliability of the period in which the out-focus status is to be maintained.

When the period in which the out-focus status is to be maintained is equal to or greater than a reference time period, the device 100 may stop data exchange between a server and a background application of the device 100 and thus may improve efficiency of power consumption of a battery of the device 100.

When the period in which the out-focus status is to be maintained is equal to or greater than the reference time period, even if an event occurs in the device 100, the device 100 may not output information of the event and thus may improve the efficiency of the power consumption.

When the period in which the out-focus status is to be maintained is equal to or greater than the reference time period, the device 100 may not receive updated data from the server and thus may improve the efficiency of the power consumption.

Based on information about an application use pattern of the user, the device 100 may adjust a position, a shape, a size, or a color of an icon of an application according to a context of the device 100, and thus may allow an application which is frequently used according to the context of the device 100, to be more easily found than an application that is not frequently used. Accordingly, an image conversion required to select an application is decreased, so that the efficiency of the power consumption of the battery of the device 100 may be improved.

Figure 3:
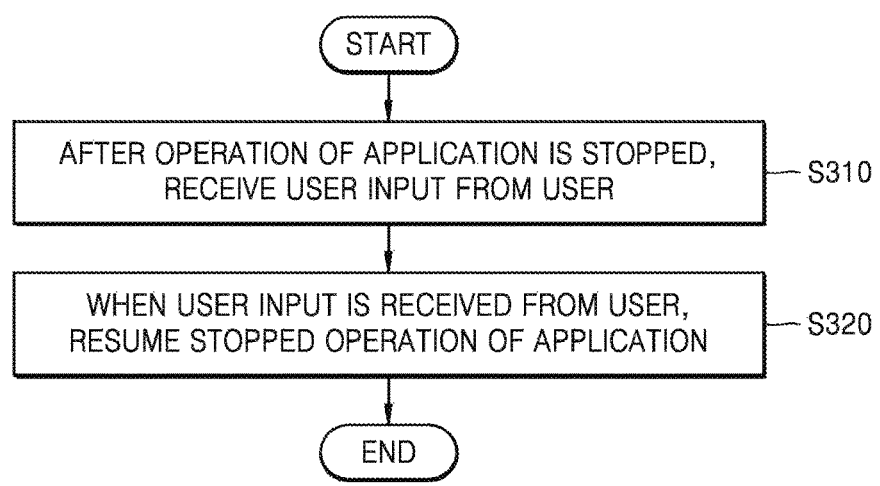
FIG. 3 is a flowchart illustrating a method of resuming a stopped operation of an application, based on an end of an out-focus status, according to an embodiment of the present disclosure.

FIG. 3 is a flowchart illustrating a method of resuming a stopped operation of an application based on an end of an out-focus status, the method being performed by a device, according to an embodiment of the present disclosure.

Referring to FIG. 3, in operation S310, after the operation of the application is stopped, a device 100 may receive a user input from a user.

For example, the device 100 may inactivate a screen in the out-focus status, and while the screen is inactivated, the device 100 may receive a user input for pressing a key to activate the screen.

In operation S320, when the user input is received, the device 100 may resume the stopped operation of the application.

When the user input is received in the out-focus status, the device 100 may cancel the out-focus status and may resume the stopped operation of the application.

For example, the device 100 may resume a stopped data exchange between a server and a background application of the device 100. The device 100 may output event information that was not output. The device 100 may receive, from the server, updated data that was not received, and may update an application by using the updated data.

FIG. 4A illustrates a table related to a method of determining that an out-focus status has started, the method being performed by a device, according to an embodiment of the present disclosure.

Referring to FIG. 4A, the device 100 may determine the out-focus status based on a predefined operation of a device 100 and a user's reaction with respect to the predefined operation of the device 100.

For example, when the device 100 receives a user input for turning off a screen when the screen of the device 100 is turned on, the device 100 may turn off the screen. When the device 100 does not receive a user input for a preset time period, the device 100 may turn off the screen. Since the screen is turned off, the device 100 may determine that the out-focus status has started.

In an embodiment, when an operation mode of the device 100 is changed to a sleep mode, the device 100 may determine that the out-focus status has started. The sleep mode may indicate a mode during which operations of the device 100 are temporally stopped. For example, during the sleep mode, the device 100 may store in a random-access memory (RAM), a machine state (e.g., a register value, a stack pointer value, etc.) indicating an operating status of the device 100, may supply to the RAM power sufficient only to retain data in the RAM, and may block a power supply to other physical configurations of the device 100, thus temporally stopping operation of the device 100. In some embodiments, the sleep mode may be referred to as a power saving mode. When the device 100 receives the user input for turning off the screen or does not receive the user input for the preset time period, the device 100 may change the operation mode of the device 100 to the sleep mode.

As another example, when the device 100 receives a call connection request from a telephone network server, the device 100 may output an image or sound to notify the user about reception of the call connection request. In this regard, when a user input for call connection is not received and thus the call connection request is refused, the device 100 may determine that the out-focus status has started.

For example, when a push message is received from a server, the device 100 may output an image or sound to notify the user about reception of the push message. When a user input for checking the push message is not received, the device 100 may determine that the out-focus status has started.

As another example, when the user wears a wearable device such as a watch and uses both the device 100 and the watch, the device 100 may communicate with the wearable device via short-distance communication.

Figure 4B:
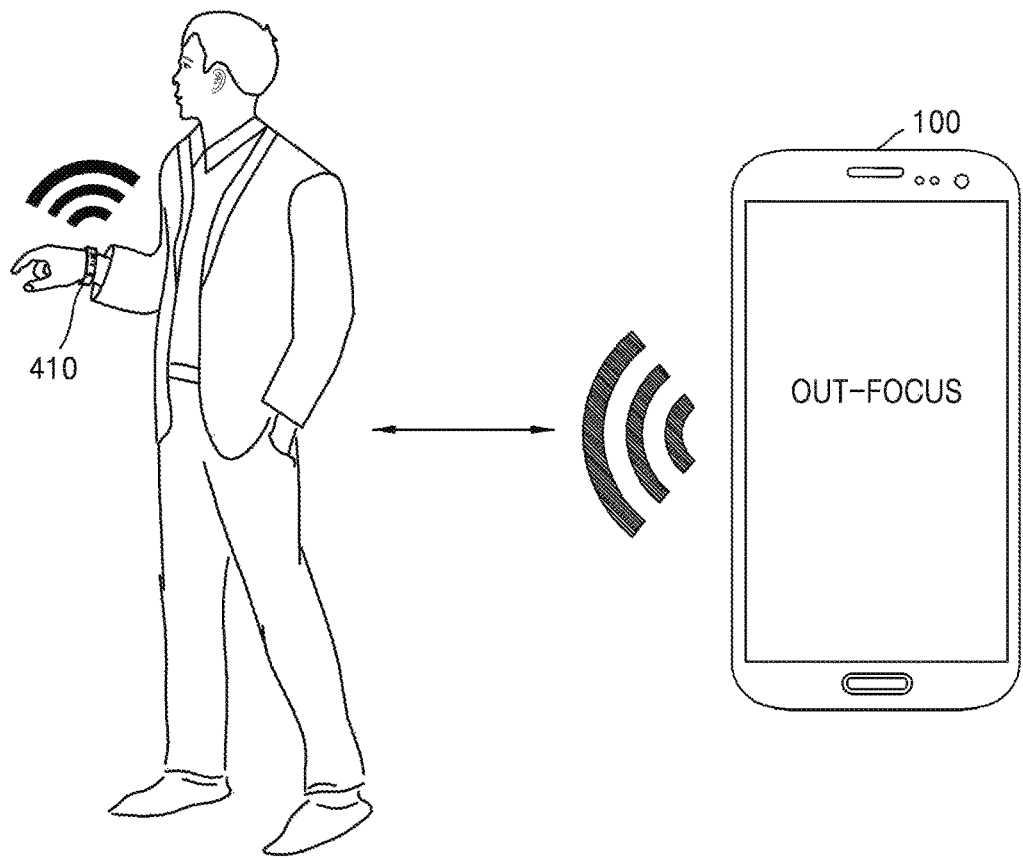

FIG. 4B illustrates a diagram in relation to a method of determining that an out-focus status has started, the method being performed by a device, according to an embodiment of the present disclosure.

Referring to FIG. 4B, when a user becomes distant from a device 100, a strength (e.g., a received signal strength indicator (RSSI)) of a short-distance wireless signal between the device 100 and a wearable device 410 may be decreased. When the strength of the short-distance wireless signal between the device 100 and the wearable device 410 becomes equal to or less than a reference strength, the device 100 may determine that the out-focus status has started. In a case where the user becomes distant from the device 100 and thus Bluetooth pairing between the device 100 and the wearable device 410 is discontinued, the device 100 may determine that the out-focus status has started.

When the screen is turned off, a call is missed, or a message is missed, the device 100 may determine the out-focus status by further considering a type of an application executed in the device 100.

When the screen is turned off, the call is missed, or the message is missed, if an application for outputting data such as music or a moving picture is executed in the device 100, the device 100 may not determine that the out-focus status has started but may determine that an in-focus status in which the user uses the device 100 is maintained. When an application for exchanging data between an external device and the device 100 is executed, wherein the exchange, e.g., tethering or data exchange with a personal computer (PC), is performed due to manipulation by the user, the device 100 may determine that the in-focus status is maintained.

FIG. 5 illustrates a table related to a method of determining an end of an out-focus status, the method being performed by a device, according to an embodiment of the present disclosure.

Referring to FIG. 5, when a device 100 receives a user input by using a sensor in the device 100, the device 100 may determine that the out-focus status has been ended. The sensor in the device 100 may include, but is not limited to, a button key, a touch key, an operation sensor, a posture sensor, a motion sensor, or the like.

In an embodiment, even if the device 100 receives a first input by using the sensor in the device 100, if a second input is not received for a preset time period from when the first input is received, the device 100 may not determine that the out-focus status has been ended but may determine that the out-focus status is maintained. Accordingly, even if the button key or the touch key is pressed regardless of a user's intention since the device 100 is inside a pocket or a bag, the device 100 may not determine that the out-focus status has been ended but may determine that the out-focus status is maintained.

In a case where an application is executed in the device 100 and thus information is output, if a strength of a short-distance wireless signal between the device 100 and a wearable device is decreased and then is increased, the device 100 may determine that the out-focus status has started and then is ended again.

Figure 6:
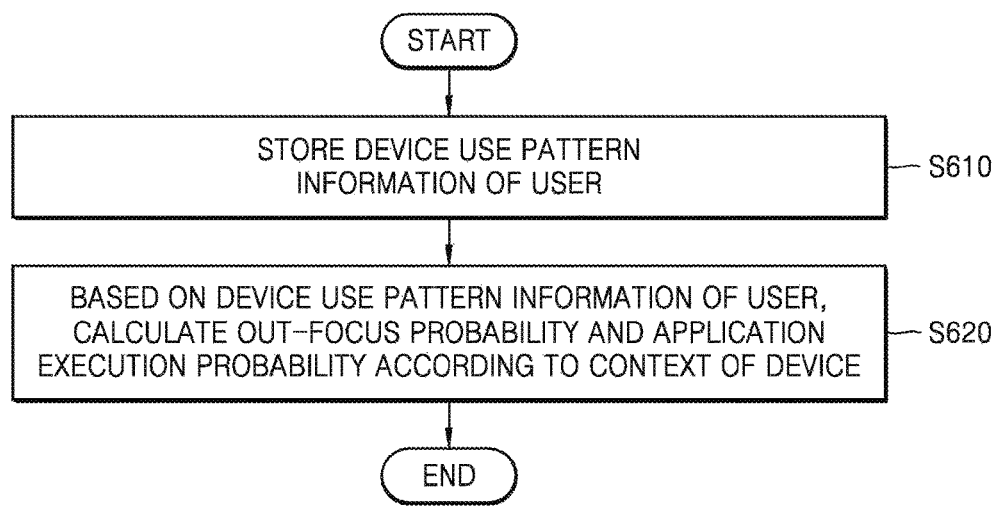
FIG. 6 is a flowchart illustrating a method of determining an out-focus probability based on device use pattern information of a user, according to an embodiment of the present disclosure.

FIG. 6 is a flowchart illustrating a method of determining an out-focus probability based on device use pattern information of a user, the method being performed by a device, according to an embodiment of the present disclosure.

Referring to FIG. 6, in operation S610, a device 100 may store the device use pattern information of the user.

FIG. 7 illustrates device use pattern information of a user according to an embodiment of the present disclosure.

Referring to FIG. 7, the device use pattern information may include a location of the device 100 according to time, a status of the device 100, and an environment surrounding the location of the device 100. Also, the device use pattern information may include one or more pieces of identification information of applications and entry paths of the applications that are executed according to time. The device use pattern information may include information about a user's reaction with respect to an event output from the device 100.

The device 100 may store locations of the device 100 according to time. For example, the device 100 may periodically obtain location information of the device 100 by using a global positioning system (GPS) sensor in the device 100. The device 100 may store the obtained location information in correspondence to a time when the location information is obtained.

The device 100 may store one or more pieces of information about the status of the device 100 according to time. The information about the status of the device 100 may include, but is not limited to, information about whether or not earphones are connected, information about a type of a wearable device connected to the device 100, information about a type of a wireless network connected to the device 100, information about an Internet protocol (IP) address of an access point that connects the device 100 and the wireless network, information about minute-by-minute power consumption of a battery of the device 100, and information about whether or not the battery of the device 100 is being charged. When the status of the device 100 is changed, the device 100 may store a changed status corresponding to a time of the changed status.

The device 100 may store a time-based change of the environment that surrounds the location of the device 100. For example, the device 100 may obtain an illuminance level or a noise level around the device 100 by using an illuminance sensor or a noise sensor in the device 100. Since the device 100 obtains information about a change of the environment, the device 100 may store the obtained information about the change in correspondence to a time when the information is obtained.

The device 100 may store execution information of an application. For example, when execution of the application is started or is ended, the device 100 may store whether or not the application is started or is ended corresponding to a start time or an end time.

The device 100 may store a user's reaction with respect to a message reception notice or a call connection request notice.

In an embodiment, the device 100 may determine whether an out-focus status has started or has been ended, and may store the out-focus status corresponding to every start time or every end time of the out-focus status.

In operation S620, the device 100 may calculate, based on the device use pattern information of the user, an out-focus probability and an application execution probability according to a context of the device 100.

The device 100 may obtain pre-stored out-focus status information according to time. Also, the device 100 may determine a status in which an application is not executed, as an out-focus status in which the user does not use the device 100, and thus may obtain out-focus status information by referring to a pre-stored execution time of the application.

The device 100 may calculate the out-focus probability based on one or more pieces of out-focus status information during a preset period.

For example, the device 100 may determine the out-focus probability in reference time units between 0 a.m. through 24 p.m., based on one or more pieces of out-focus status information during recent days. The reference time units may be, but is not limited to, 5 minutes, 10 minutes, 30 minutes, or 1 hour units.

The device 100 may determine out-focus probabilities corresponding to days of the week, respectively. The device 100 may determine an out-focus probability corresponding to weekdays or weekends.

The device 100 may determine an out-focus probability according to a location. For example, the device 100 may obtain a value calculated by adding a value of an out-focus status according to the location to a value of a time period of the out-focus status at the same location during a preset period. The device 100 may divide the obtained value by a time period during which the device 100 is located at the same location during the preset period, and thus may determine the out-focus probability at the same location.

The device 100 may determine an out-focus probability according to a transportation type. For example, the device 100 may obtain a value calculated by adding a value of an out-focus status according to the transportation type to a value of a time period of the out-focus status in the same transportation type during a preset period. The device 100 may divide the obtained value by a time period during which the device 100 is located in the same transportation type during the preset period, and thus may determine the out-focus probability in the same transportation type.

Also, the device 100 may determine an out-focus probability according to a change in a status of the device 100. For example, the device 100 may determine an out-focus probability with respect to a wearable device based on a value of an out-focus status according to the wearable device connected to the device 100.

The device 100 may determine an out-focus probability according to a change in an environment around the device 100. For example, the device 100 may determine an out-focus probability according to a noise level based on a value of the out-focus probability according to the noise level.

The device 100 may autonomously calculate an out-focus probability or may transmit to a pattern calculation server, information about a time, a location, a status of the device 100, and an environment surrounding the location of the device 100, and may receive the out-focus probability from the pattern calculation server. In this case, based on use pattern information of the user which is received from the device 100, the pattern calculation server may calculate the out-focus probability according to a change in the environment surrounding the location of the device 100.

The device 100 may calculate an execution probability of each of applications according to a context of the device 100. The context may include, but is not limited to, a time, a location of the device 100, a status of the device 100, and a surrounding environment of the device 100.

For example, the device 100 may divide total time periods in which a web browser is executed in the subway during a preset period by total time periods in which all applications are executed in the subway during the preset period, and thus may calculate an execution probability of the web browser with respect to the subway.

As another example, the device 100 may divide the number of times a game application is executed when a type of network connected to the device 100 is Wi-Fi by the number of times all applications are executed when the type of network connected to the device 100 is Wi-Fi, and thus may calculate an execution probability of the game application with respect to Wi-Fi.

The device 100 may calculate a user's reaction probability with respect to an event based on the context. The device 100 may consider the calculated user's reaction probability with respect to the event based on the context and may calculate an out-focus probability with respect to the context.

For example, when the number of times a call is missed or a message is not checked during an out-focus status in a particular time zone is greater than in other time zones, the device 100 may set an out-focus probability in the particular time zone to be higher than out-focus probabilities in other time zones.

The device 100 may determine, based on calculated execution probabilities of applications according to the context, an order of an execution probability of an application among the applications according to the context.

The device 100 may calculate hourly power consumption of the battery 180 with respect to a particular application. The device 100 may calculate hourly power consumption of the battery with respect to the context.

Referring again to FIG. 7, the device 100 may store use pattern information of the user.

The device 100 may calculate latitudes and longitudes of the device 100 which are changed according to movement of the device 100. In this case, the device 100 may also store times where the latitudes and longitudes are obtained.

In an embodiment, the device 100 may store an IP address of an access point that connects the device 100 to a network.

The device 100 may recognize a place, based on the stored IP address, and may store an out-focus status according to the identified place.

The device 100 may store information about a status of the device 100 according to time. The status of the device 100 may include, but is not limited to, connection or disconnection of earphones, a type of a wearable device connected to the device 100, a network allowing communication between the device 100 and an external device, or power consumption of a battery of the device 100.

When the device 100 and the wearable device are connected to each other, the device 100 may receive identification information of the wearable device from the wearable device. The device 100 may determine the type of the wearable device based on the received identification information of the wearable device.

Whenever a preset status of the device 100 is changed, the device 100 may store a time and the changed status. For example, when earphones are connected or are disconnected, when the wearable device is connected or is disconnected, when the network connected to the device 100 is changed, or when the power consumption of the battery is changed exceeding a reference range, the device 100 may store the changed status and the time of the change.

The device 100 may store information about a surrounding environment of the device 100 according to time. The surrounding environment of the device 100 may include, but is not limited to, illuminance or noise.

The device 100 may store application execution information according to time. The application execution information may include, but is not limited to, identification information of an application that is executed or is ended, time information about when the application is executed or is ended, and information about an entry path when the application is executed.

The device 100 may store information of a user's reaction with respect to an event. The event may include, but is not limited to, a message reception notice, a call connection request notice, an alarm notice, a schedule notice, or the like.

In an embodiment, the device 100 may determine whether an out-focus status has started or has been ended, and whenever the out-focus status starts or is ended, the device 100 may store a start or an end of the out-focus status in correspondence to time.

Figure 8:
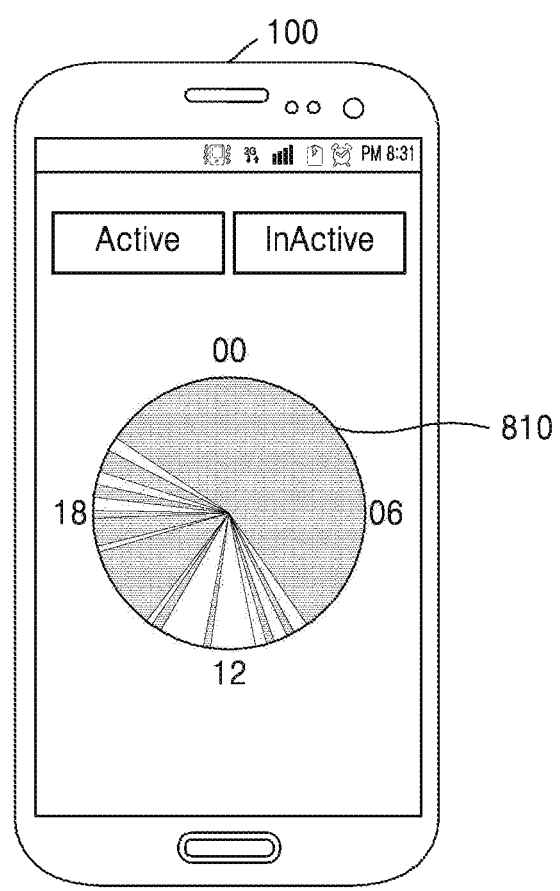
FIG. 8 illustrates a device in relation to a method of displaying an out-focus status according to a context of the device, according to an embodiment of the present disclosure.

FIG. 8 illustrates a device in relation to a method of displaying an out-focus status according to a context of the device, the method being performed by a device, according to an embodiment of the present disclosure.

Referring to FIG. 8, a device 100 may provide an out-focus status according to time.

For example, when the device 100 receives a user input for selecting a menu to display an out-focus status, the device 100 may display an image 810 indicating the out-focus status according to time.

The out-focus status according to time may include, but is not limited to, an out-focus status detected on a particular date, an average out-focus status of a particular day, an average out-focus status during a particular period, an average out-focus status during weekdays, or an average out-focus status during a weekend.

Figure 9:
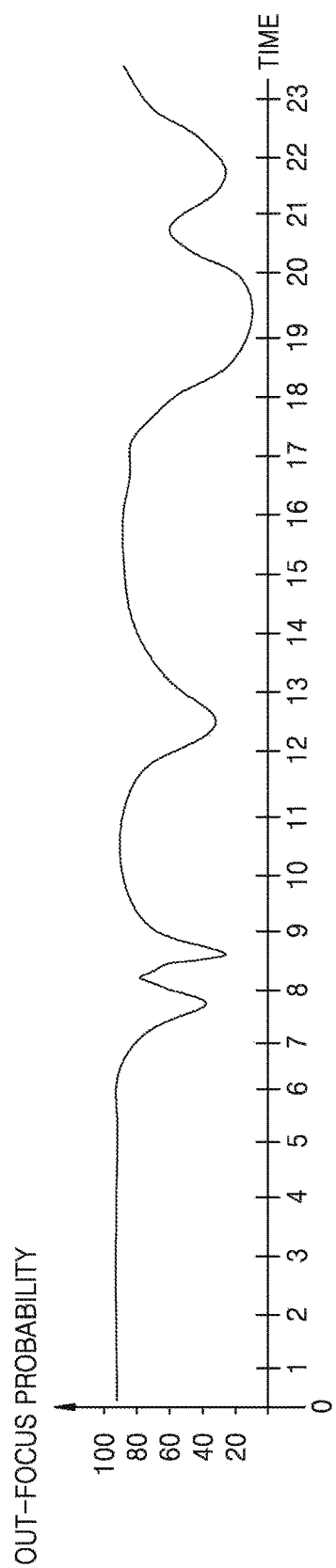
FIG. 9 illustrates a graph related to a method of determining out-focus probabilities according to time, according to an embodiment of the present disclosure.

FIG. 9 illustrates a graph related to a method of determining out-focus probabilities according to time, the method being performed by a device, according to an embodiment of the present disclosure.

Referring to FIG. 9, a device 100 may calculate out-focus probabilities according to time between 0 a.m. through 24 p.m. on each of Monday through Sunday.

For example, the device 100 may determine an out-focus probability in reference time units between 0 a.m. through 24 p.m., based on information about an out-focus status on recent Mondays.

For example, the device 100 may divide total time periods of out-focus statuses between 22:00 to 22:10 for 30 Mondays by 300 minutes (e.g., 10 minutes×30) that is a total time, and thus may determine an out-focus probability between 22:00 to 22:10 on Monday.

The device 100 may calculate the out-focus probabilities according to time on each of Monday through Sunday or may calculate an out-focus probability during weekdays or weekends.

Figure 10A:
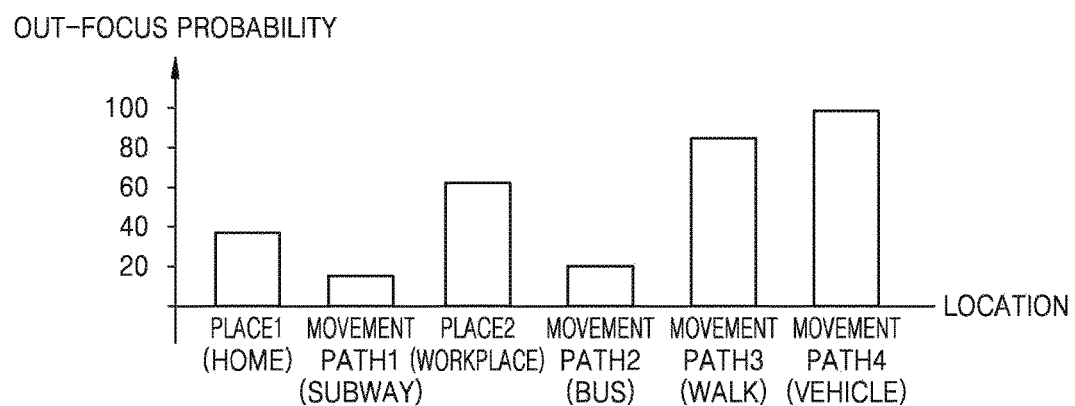
FIG. 10A illustrates a graph related to a method of determining an out-focus probability according to a location, according to an embodiment of the present disclosure.

FIG. 10A illustrates a graph related to a method of determining an out-focus probability according to a location, the method being performed by a device, according to an embodiment of the present disclosure.

Referring to FIG. 10A, a device 100 may calculate an out-focus probability in a particular location or a particular movement path.

The device 100 may determine a place where the device 100 is located for a certain period of time, based on location information according to time with respect to the device 100. For example, the device 100 may determine a staying time period of the device 100 in each place, and when an average value of a staying time period of the device 100 in a particular place is equal to or greater than a reference time period, the device 100 may determine the particular place as a place where the device 100 is mainly located. Accordingly, the device 100 may recognize a location such as a user's residence, workplace, or class room. For example, the device 100 may recognize a place where the device 100 is located, based on an IP address of an access point that connects the device 100 to a network.

The device 100 may recognize a movement path where the device 100 is mainly moved based on location information according to time with respect to the device 100. For example, the device 100 may determine a movement path where the device 100 is moved based on the location information according to time, and when the number of using the determined movement path is equal to or greater than a reference number, the device 100 may determine the determined movement path as a path where the device 100 is mainly moved. In this case, even if the path is one connected movement path, the device 100 may determine the path as different movement paths according to movement speeds.

After the place where the device 100 is mainly located and the main movement paths of the device 100 are determined, the device 100 may calculate an out-focus probability in a particular location and a particular movement path.

For example, the device 100 may divide a total time period of an out-focus status in the particular location by a total staying time period with respect to the particular location, and thus may calculate the out-focus probability in the particular location. The device 100 may divide a total time period of an out-focus status in the particular movement path by a total staying time period with respect to the particular movement path, and thus may calculate the out-focus probability in the particular movement path.

Figure 10B:
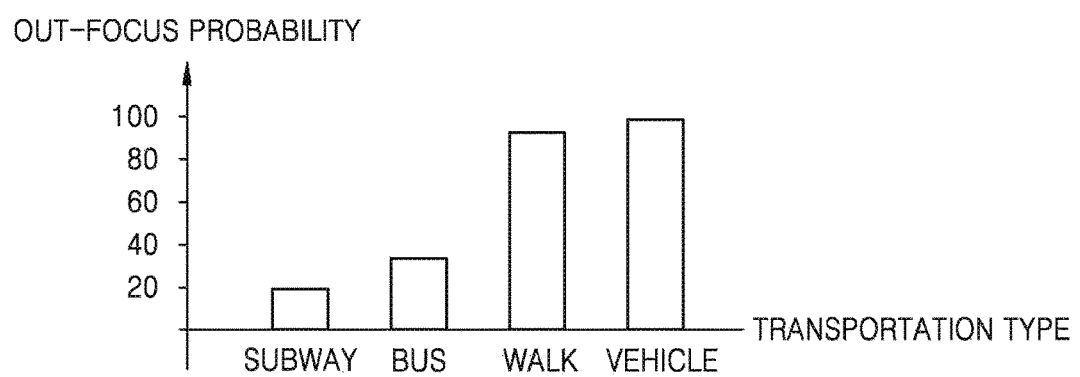
FIG. 10B illustrates a graph related to a method of determining an out-focus probability according to a transportation type, according to an embodiment of the present disclosure.

FIG. 10B illustrates a graph related to a method of determining an out-focus probability according to a transportation type, the method being performed by a device, according to an embodiment of the present disclosure.

Referring to FIG. 10B, a device 100 may calculate the out-focus probability according to the transportation type.

For example, the device 100 may recognize the transportation type based on location information according to time. For example, when the location information according to time with respect to the device 100 is similar to a pre-stored movement path via the subway, the device 100 may determine that a user having the device 100 moved via the subway. When the location information according to time with respect to the device 100 is similar to a pre-stored movement pattern via a bus, the device 100 may determine that the user having the device 100 moved via the bus. The movement pattern via the bus may be a pattern of stopping for several seconds at each of predefined bus stops.

When the location information according to time with respect to the device 100 indicates a pre-stored pattern of moving along a road, the device 100 may determine that the user having the device 100 moved via a vehicle.

When the transportation type that is mainly used is determined, the device 100 may calculate the out-focus probability with respect to a particular transportation type.

For example, the device 100 may divide a total time period of an out-focus status with respect to the particular transportation type by a total time period of using the particular transportation type, and thus may calculate the out-focus probability with respect to the particular transportation type.

FIGS. 11A to 11D illustrate graphs related to a method of calculating an out-focus probability according to a status of a device or a surrounding environment of the device, the method being performed by a device, according to various embodiments of the present disclosure.

Figure 11A:
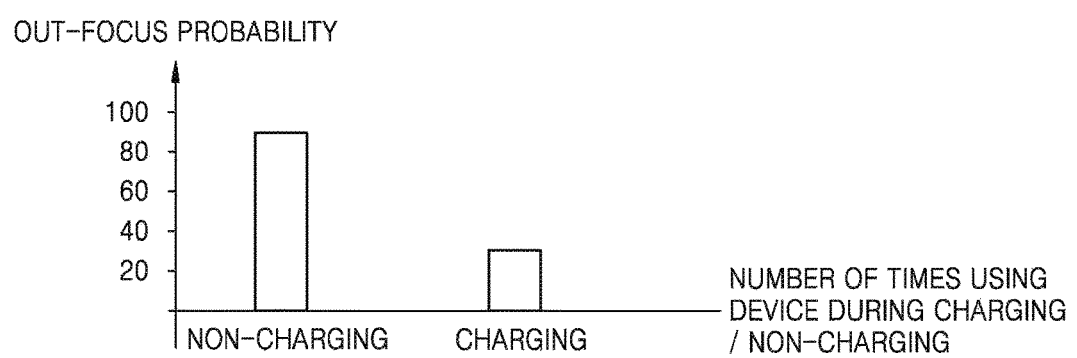
FIGS. 11A to 11D illustrate graphs related to a method of calculating an out-focus probability according to a status of a device or a surrounding environment of the device, according to various embodiments of the present disclosure.

Referring to FIG. 11A, a device 100 may calculate an out-focus probability about when a battery of the device 100 is being charged or is not charged based on information about an out-focus status with respect to whether or not the battery is charged.

Figure 11B:
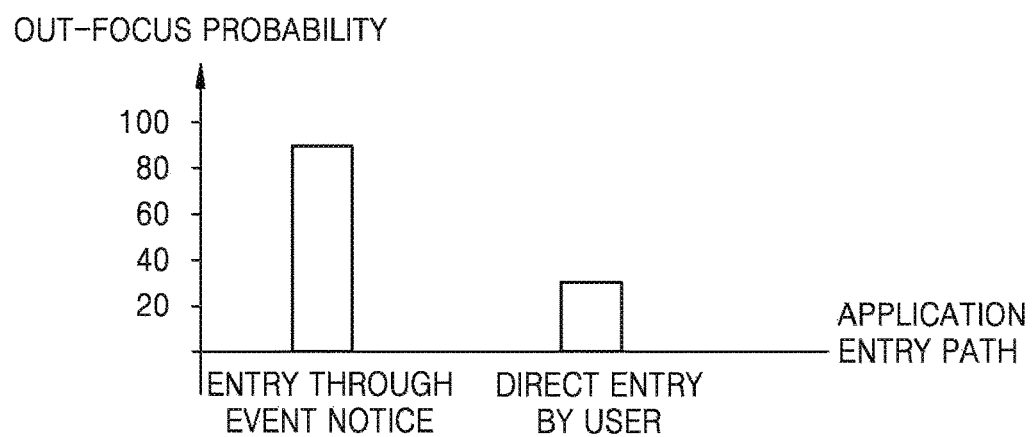

Referring to FIG. 11B, a device 100 may calculate an out-focus probability with respect to an entry path of an application based on information about an out-focus status according to the entry path. For example, the entry path may include an entry path through an event notice or a direct entry path by a user.

Figure 11C:
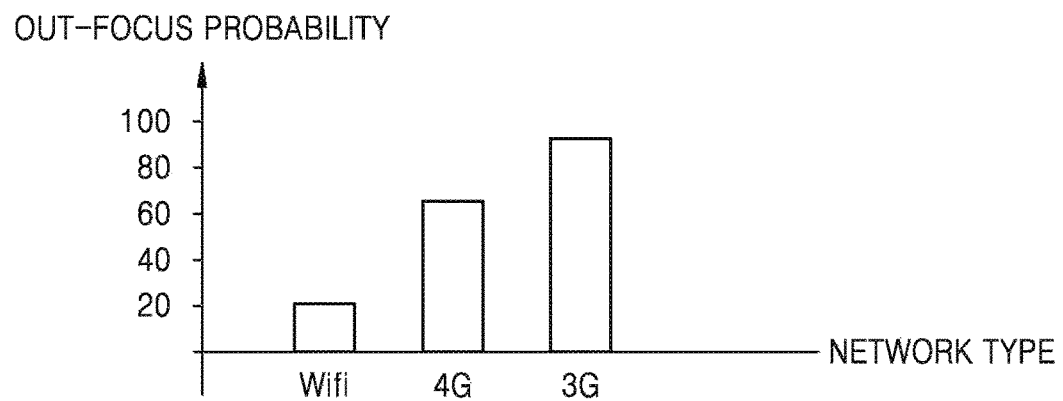

Referring to FIG. 11C, a device 100 may calculate an out-focus probability with respect to a type of a network based on information about an out-focus status according to the type of the network.

Figure 11D:
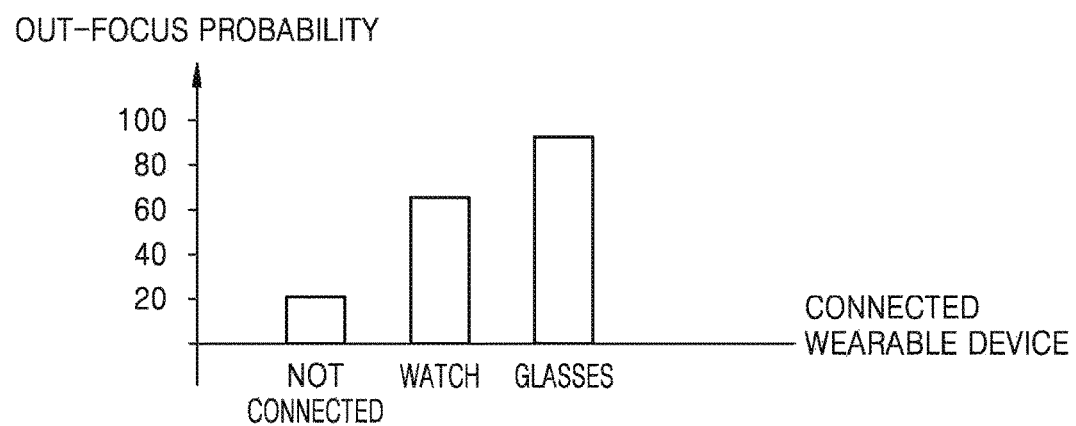

Referring to FIG. 11D, a device 100 may calculate an out-focus probability with respect to a type or identification information of a wearable device connected to the device 100 based on information about an out-focus status according to the type or identification information of the wearable device.

Figure 12A:
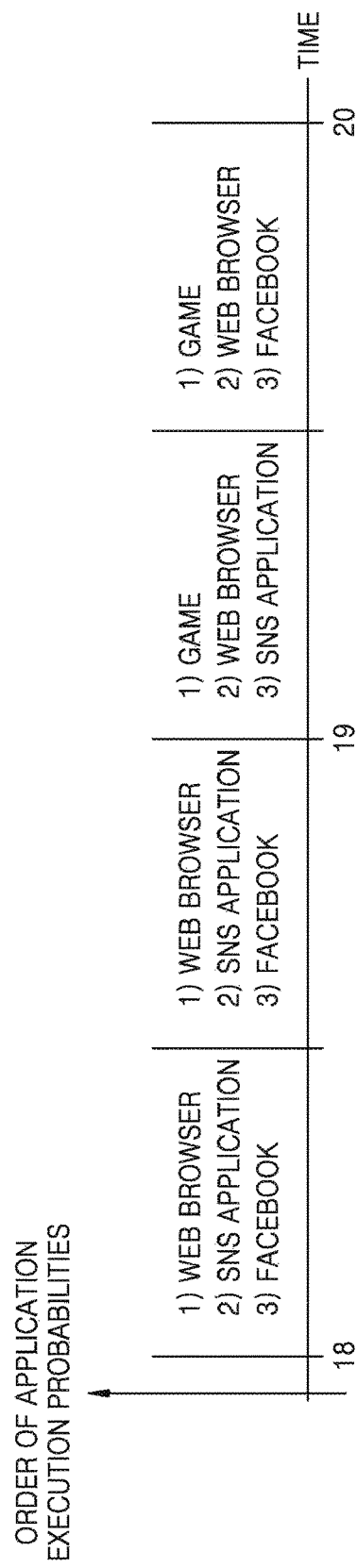
FIGS. 12A and 12B illustrate diagrams related to a method of calculating an order of execution probabilities of applications according to a context, according to various embodiments of the present disclosure.
Figure 12B:
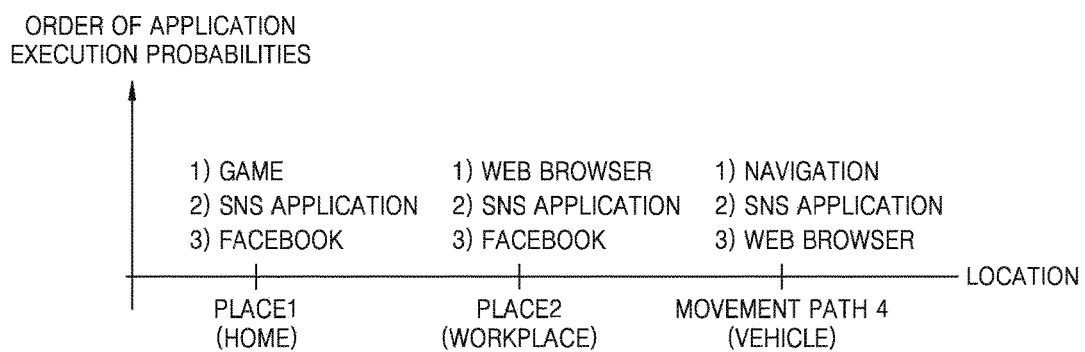

FIGS. 12A and 12B illustrate diagrams related to a method of calculating an order of execution probabilities of applications according to a context, the method being performed by a device, according to various embodiments of the present disclosure.

Referring to FIG. 12A, a device 100 may calculate the order of the execution probabilities of the applications according to time based on device use pattern information of a user.

For example, the device 100 may divide a total time period in which a web browser is executed from 18 p.m. through 18:30 p.m. during a preset period by a total time period in which all applications are executed during the same time, and thus may calculate an execution probability of the web browser from 18 p.m. through 18:30 p.m.

When the execution probabilities of the applications installed in the device 100 are calculated, the device 100 may calculate an order of an application to be executed during a particular time based on the calculated execution probabilities of the applications with respect to the particular time.

Referring to FIG. 12B, the device 100 may calculate an order of application execution probabilities according to a place, based on the device use pattern information of the user.

For example, the device 100 may divide a total time period in which a game application is executed in home during a preset period by a total time period in which all applications are executed in home during the preset period, and thus may calculate a possibility of execution of the game application in home.

When the execution probabilities of the applications installed in the device 100 are calculated, the device 100 may calculate the order of the application to be executed at the particular place based on the calculated execution probabilities of the applications with respect to the particular place.

Figure 13:
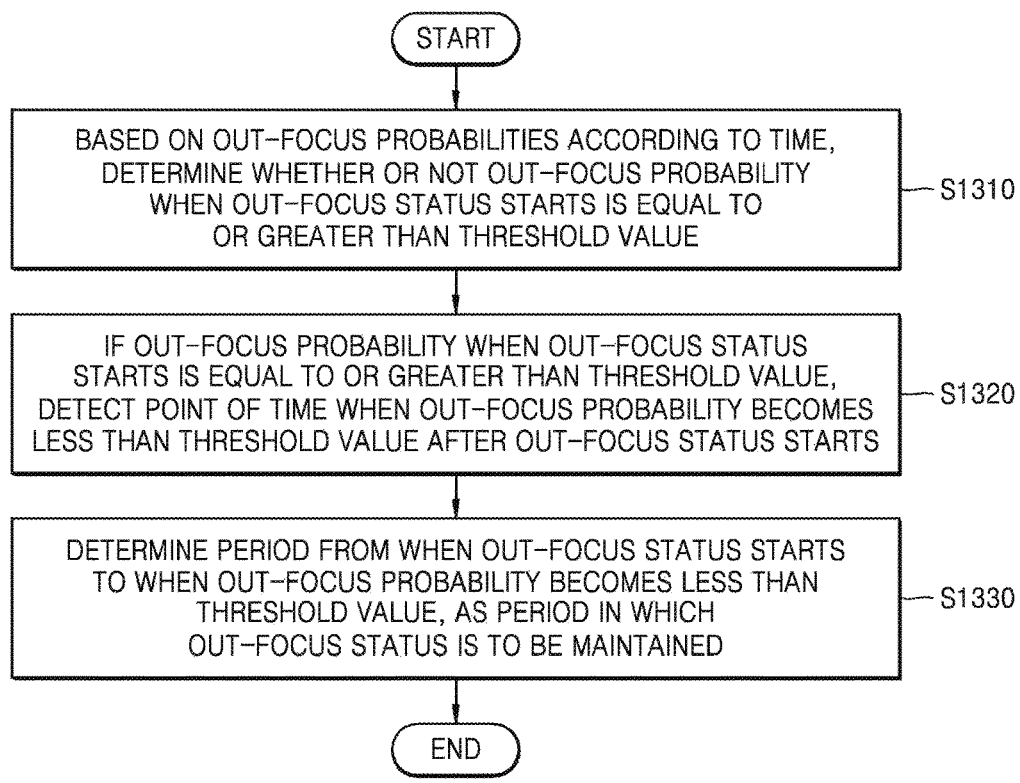
FIG. 13 is a flowchart illustrating a method of determining a period in which an out-focus status is to be maintained based on out-focus probabilities according to time, according to an embodiment of the present disclosure.

FIG. 13 is a flowchart illustrating a method of determining a period in which an out-focus status is to be maintained based on out-focus probabilities according to time, the method being performed by a device, according to an embodiment of the present disclosure.

Referring to FIG. 13, in operation S1310, a device 100 may determine, based on the out-focus probabilities according to time, whether or not an out-focus probability when an out-focus status starts is equal to or greater than a threshold value.

For example, the threshold value may be 75% but is not limited thereto.

In operation S1320, if the out-focus probability when the out-focus status starts is equal to or greater than the threshold value, the device 100 may detect a point of time when the out-focus probability becomes less than the threshold value after the out-focus status starts.

If the out-focus probability when the out-focus status starts is equal to or greater than the threshold value, the device 100 may detect a point of time when the out-focus probability initially becomes less than the threshold value after the out-focus status starts.

In operation S1330, the device 100 may determine a period from when the out-focus status starts to when the out-focus probability becomes less than the threshold value as the period in which the out-focus status is to be maintained.

In an embodiment, if the out-focus probability when the out-focus status starts is equal to or greater than the threshold value, the device 100 may detect a particular point of time when an average value of out-focus probabilities from when the out-focus status starts to the particular point of time becomes equal to or greater than a preset threshold value, and may determine a period from when the out-focus status starts to the detected particular point of time as the period in which the out-focus status is to be maintained.

Figure 14:
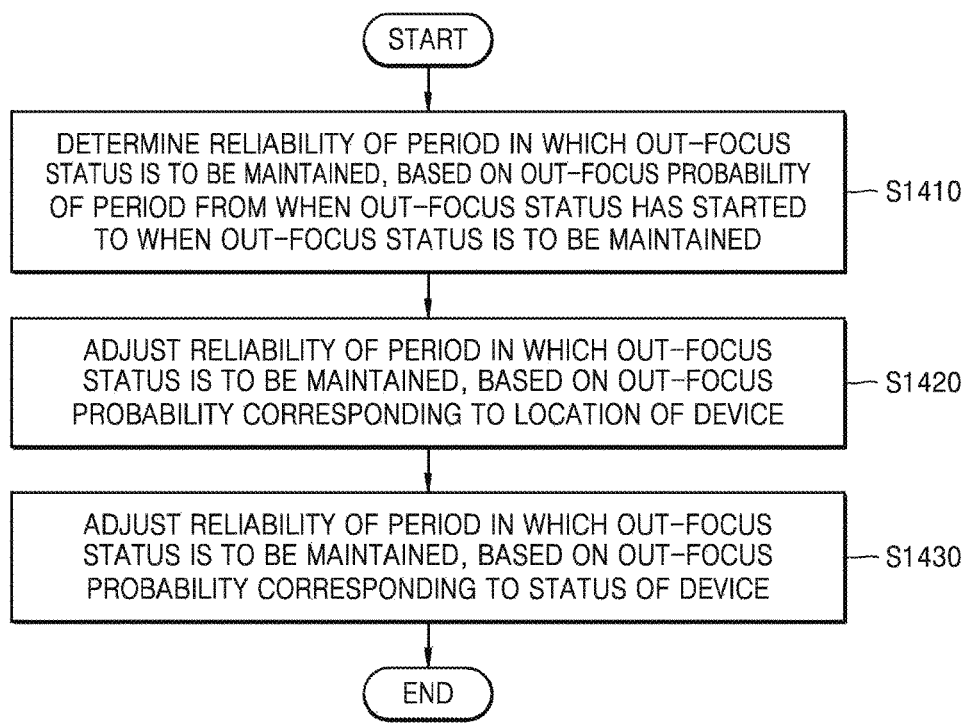
FIG. 14 is a flowchart illustrating a method of determining reliability of a period in which an out-focus status is to be maintained based on an out-focus probability according to a context, according to an embodiment of the present disclosure.

FIG. 14 is a flowchart illustrating a method of determining reliability of a period in which an out-focus status is to be maintained based on an out-focus probability according to a context, the method being performed by a device, according to an embodiment of the present disclosure.

Referring to FIG. 14, in operation S1410, a device 100 may determine reliability of a period in which an out-focus status is to be maintained based on an out-focus probability of a period from when the out-focus status has started to when the out-focus status is to be maintained.

For example, the device 100 may determine the reliability of the period in which the out-focus status is to be maintained based on an average value of out-focus probabilities of the period from when the out-focus status has started to when the out-focus status is maintained.

In operation S1420, the device 100 may adjust the reliability of the period in which the out-focus status is to be maintained based on an out-focus probability corresponding to a location of the device 100.

The device 100 may determine the location of the device 100 when the out-focus status has started. The device 100 may obtain an out-focus probability corresponding to the determined location based on the out-focus probability according to the location.

The device 100 may adjust the reliability of the period in which the out-focus status is to be maintained based on the out-focus probability corresponding to the location.

In operation S1430, the device 100 may adjust the reliability of the period in which the out-focus status is to be maintained based on an out-focus probability corresponding to a status of the device 100.

The device 100 may determine the status of the device 100 when the out-focus status has started. The device 100 may obtain an out-focus probability corresponding to the determined status based on the out-focus probability according to the status. The device 100 may adjust the reliability of the period in which the out-focus status is to be maintained based on the out-focus probability corresponding to the status.

Referring again to FIG. 14, the time, the location of the device 100, and the status of the device 100 are described as parameters to be considered so as to determine the reliability of the period in which the out-focus status is to be maintained. However, the device 100 may consider another context of the device 100 other than the parameters and may determine the reliability of the period in which the out-focus status is to be maintained.

For example, according to status values of contexts of the device 100, the device 100 may determine a context among the contexts whose difference between its status value and the out-focus probability is equal to or greater than a reference as a parameter to determine the reliability of the period in which the out-focus status is to be maintained.

The device 100 may vary a weight of the contexts and may determine the reliability of the period in which the out-focus status is to be maintained. For example, according to the status values of the contexts of the device 100, the greater a difference between a value of the out-focus probability and a status value of a context among the contexts is, the greater the weight added by the device 100 to the context.

In an embodiment, when an out-focus probability according to a context of the device 100 when the out-focus status has started is within a reference range, the device 100 may not consider, in calculating the reliability, the context whose out-focus probability is within the reference range. For example, the reference range may be between 45% through 55%.

For example, when an out-focus probability at a particular location is between 45% through 55%, a probability whether or not the user uses the device 100 at the particular location may be considered as meaningless data, thus, the device 100 may not consider the context whose out-focus probability is within the reference range.

Figure 15:
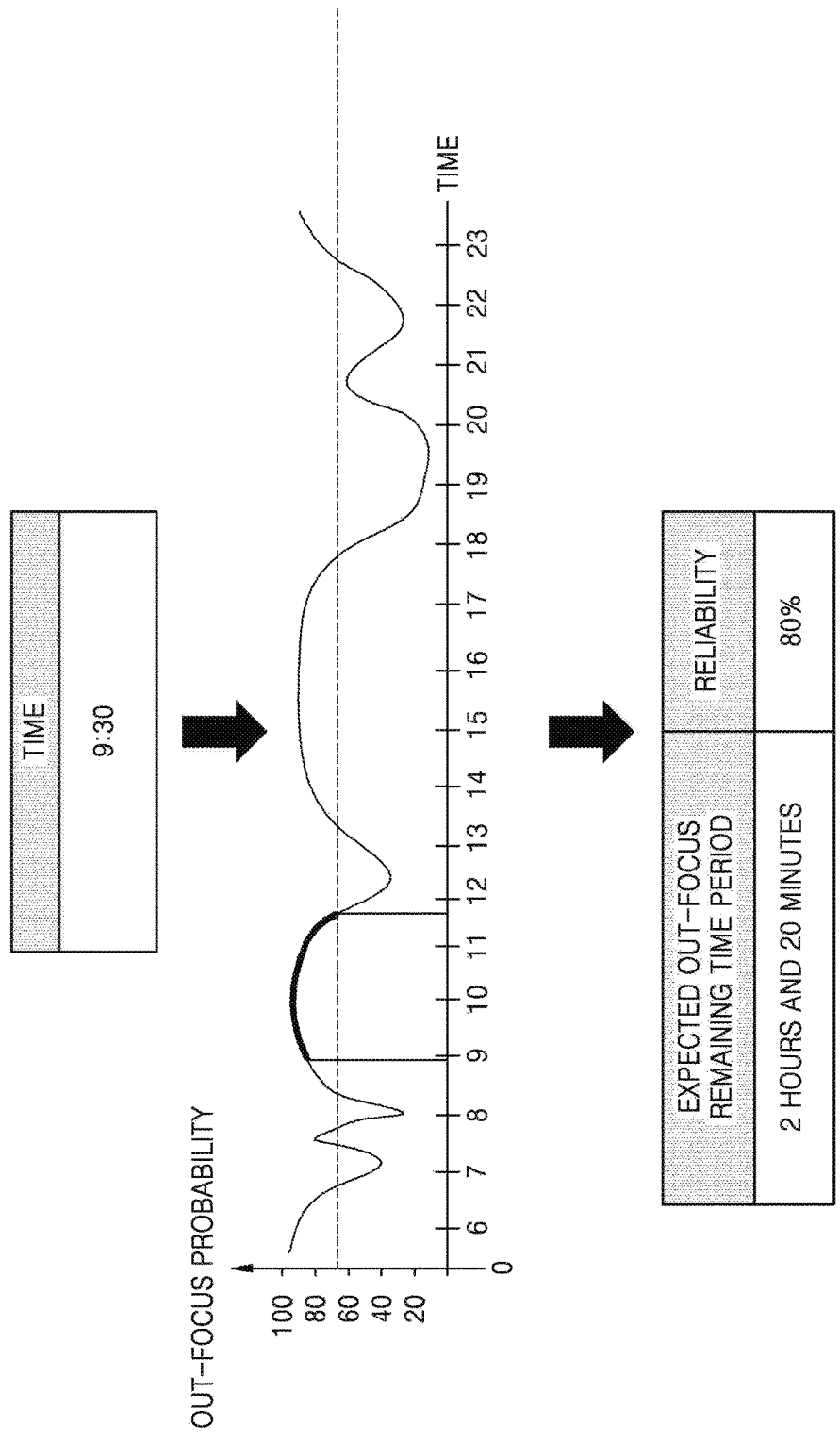
FIG. 15 illustrates a diagram related to a method of determining a period in which an out-focus status is to be maintained based on out-focus probabilities according to time, according to an embodiment of the present disclosure.

FIG. 15 illustrates a diagram related to a method of determining a period in which an out-focus status is to be maintained based on out-focus probabilities according to time, the method being performed by a device, according to an embodiment of the present disclosure.

Referring to FIG. 15, a device 100 may determine the period in which the out-focus status is to be maintained based on the out-focus probabilities according to time.

For example, when a time when the out-focus status has started is 9:30 a.m., the device 100 may obtain an out-focus probability corresponding to 9:30 a.m. based on the out-focus probabilities according to time.

When the out-focus probability corresponding to 9:30 a.m. is 90%, the device 100 may determine whether or not 90% is equal to or greater than a threshold value. If the threshold value is 75%, the device 100 may determine that the out-focus probability corresponding to 9:30 a.m. is equal to or greater than the threshold value.

When the device 100 determines that the out-focus probability corresponding to 9:30 a.m. is equal to or greater than the threshold value, the device 100 may detect a point of time when an out-focus probability among out-focus probabilities of time periods after 9:30 a.m. initially becomes less than the threshold value. Referring to FIG. 15, the point of time when the out-focus probability among the out-focus probabilities of the time periods after 9:30 a.m. initially becomes less than 75% is the threshold value of 11:50 a.m.

Since the point of time when the out-focus probability initially becomes less than the threshold value is detected, the device 100 may determine a time period of 2 hours and 20 minutes from 9:30 a.m. when the out-focus status has started, to 11:50 a.m. when the out-focus probability initially becomes less than the threshold value, as the period in which the out-focus status is to be maintained.

The device 100 may determine, as reliability of the period of the out-focus status, an average value of out-focus probabilities corresponding to the period in which the out-focus status is to be maintained. Referring to FIG. 15, the device 100 may determine 80%, that is an average value of out-focus probabilities from 9:30 a.m. to 11:50 a.m., as the reliability of the time period of 2 hours and 20 minutes.

When a threshold value of preset reliability is 70%, the device 100 may determine that the device 100 will have an out-focus status during the time period of 2 hours and 20 minutes.

Figure 16A:
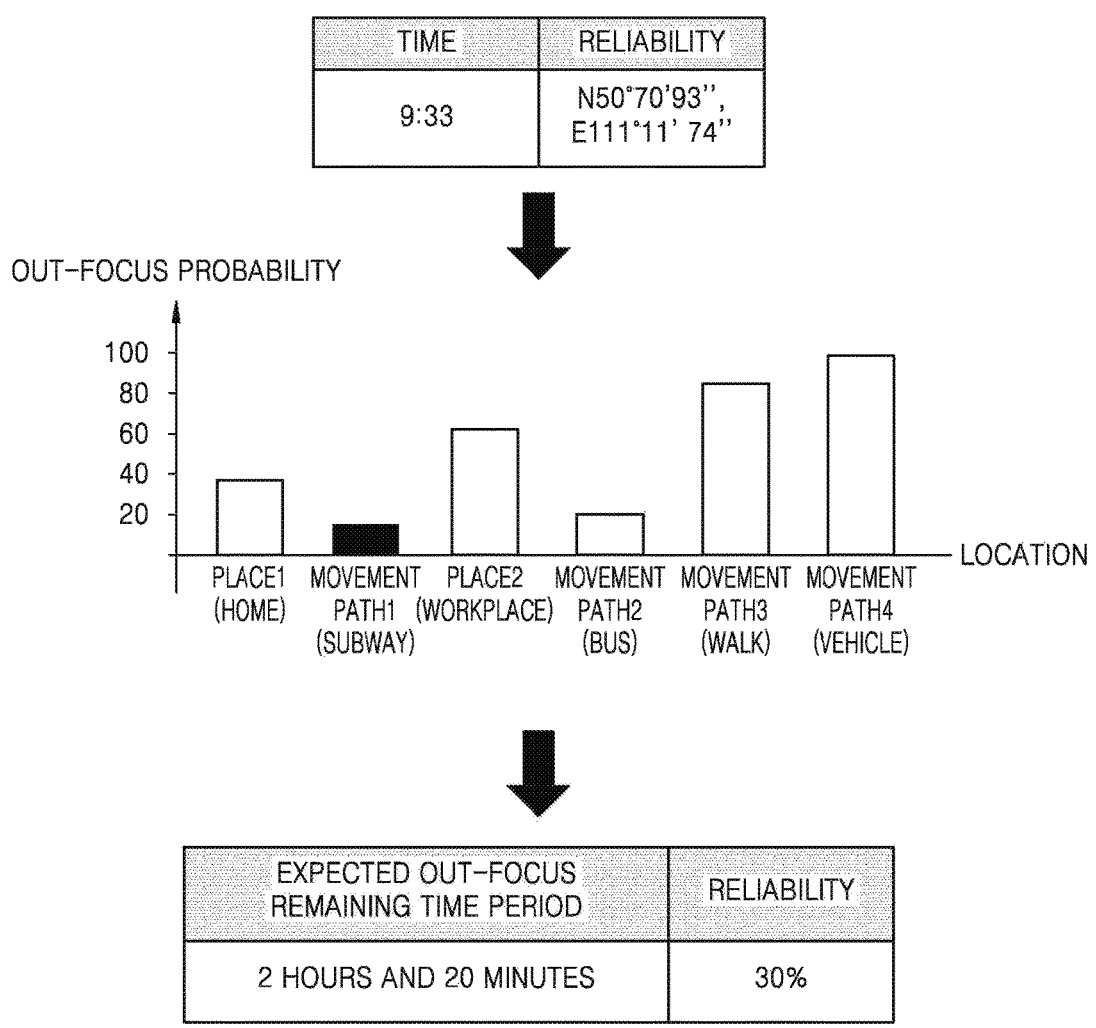
FIG. 16A illustrates a diagram related to a method of adjusting reliability by considering an out-focus probability at a location where an out-focus status has started according to an embodiment of the present disclosure.

FIG. 16A illustrates a diagram related to a method of adjusting reliability by considering an out-focus probability at a location where an out-focus status has started according to an embodiment of the present disclosure.

Referring to FIG. 16A, a device 100 may adjust the reliability by considering the out-focus probability at the location where the out-focus status has started.

The device 100 may determine that the location where the out-focus status has started is a movement path 1 based on latitude and longitude information of the location where the out-focus status has started. The device 100 may also determine that the location where the out-focus status has started is the movement path 1 based on an IP address of an access point that connects the device 100 to a network.

Based on the out-focus probability according to the location, the device 100 may obtain an out-focus probability at the movement path 1. When the out-focus probability in a place 1 is 10%, the device 100 may determine 30% as the reliability of the time period of 2 hours and 20 minutes by averaging or weight-averaging 80% and 10%, wherein 80% is the reliability of the period in which the out-focus status is to be maintained, which is determined with reference to FIG. 15, and 10% is the out-focus probability in place 1.

If the reliability for which a location is further considered drops below 30%, the device 100 may not determine that the out-focus status will be maintained during the time period of 2 hours and 20 minutes.

Figure 16B:
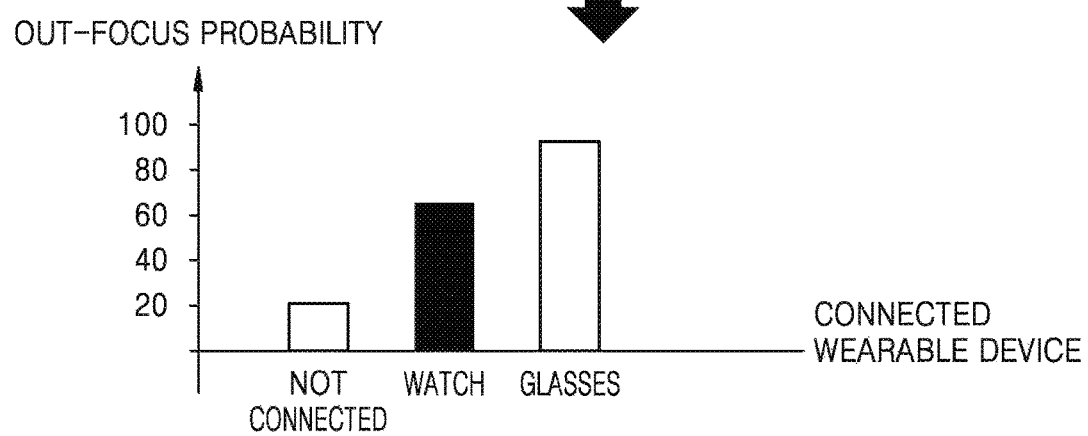
FIG. 16B illustrates a diagram related to a method of adjusting reliability by considering an out-focus probability corresponding to a status of the device when an out-focus status has started according to an embodiment of the present disclosure.

FIG. 16B illustrates a diagram related to a method of adjusting reliability by considering an out-focus probability corresponding to a status of a device when an out-focus status has started according to an embodiment of the present disclosure.

Referring to FIG. 16B, a device 100 may adjust the reliability by considering an out-focus probability corresponding to a wearable device connected to the device 100 when the out-focus status has started.

For example, the out-focus probability may be 30% when the wearable device is not connected to the device 100, the out-focus probability may be 85% when a watch is connected to the device 100, and the out-focus probability may be 90% when glasses are connected to the device 100.

When the device 100 determines that the out-focus status has started, the device 100 may obtain identification information of the wearable device connected to the device 100. The device 100 may also obtain an out-focus probability corresponding to the obtained identification information of the wearable device.

In a case where the identification information of the wearable device connected to the device 100 indicates the watch and the out-focus probability corresponding to the watch is 85%, the device 100 may determine 70% as the reliability of the time period of 2 hours and 20 minutes by averaging or weight-averaging 80%, 10%, and 85%, wherein 80% is the reliability of the period in which the out-focus status is to be maintained, which is determined with reference to FIG. 15, 10% is the out-focus probability in place 1 shown in FIG. 16A, and 85% is the out-focus probability corresponding to the watch.

If the reliability for which the identification information of the wearable device is further considered increases up to 70%, the device 100 may determine that the out-focus status will be maintained during the time period of 2 hours and 20 minutes.

Figure 17A:
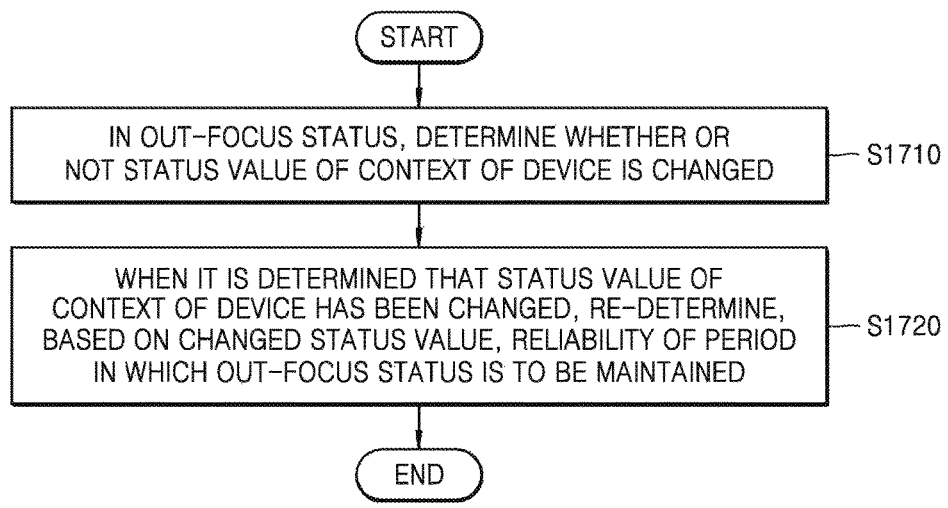
FIG. 17A is a flowchart illustrating a method of re-determining reliability of a period in which an out-focus status is to be maintained since a status value of a context of the device is changed, according to an embodiment of the present disclosure.

FIG. 17A is a flowchart illustrating a method of re-determining reliability of a period in which an out-focus status is to be maintained since a status value of a context of a device is changed, the method being performed by a device, according to an embodiment of the present disclosure.

Referring to FIG. 17A, in operation S1710, a device 100 having the out-focus status may determine whether or not a location of the device 100, a status of the device 100, or a surrounding environment of the device 100 is changed.

For example, the device 100 may determine whether earphones are connected or disconnected, the location of the device 100 is changed and thus exceeds a reference range, or illuminance surrounding the device 100 is changed and thus exceeds a reference range.

In operation S1720, when the device 100 determines that the status value of the context of the device 100 has been changed, the device 100 may re-determine, based on a changed status value, reliability of the period in which the out-focus status is to be maintained.

For example, when the device 100 determines that the location of the device 100 is changed and thus exceeds the reference range, or determines that a wearable device that has been connected to the device 100 is disconnected, the device 100 may re-determine the reliability of the period in which the out-focus status is to be maintained based on an out-focus probability at a changed location or an out-focus probability when the wearable device is not connected.

Figure 17B:
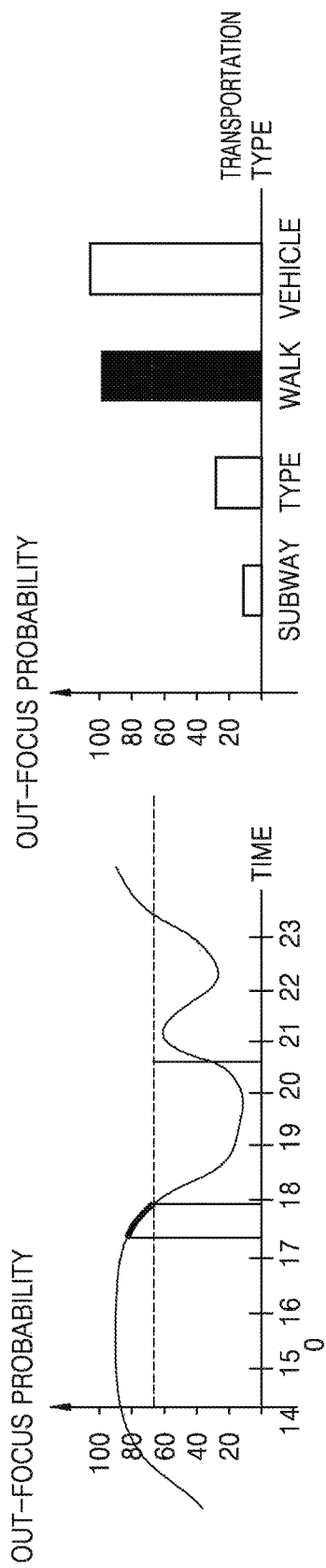
FIGS. 17B and 17C illustrate diagrams related to a method of re-determining reliability of a period in which an out-focus status is to be maintained since a status value of a context of the device is changed, according to various embodiments of the present disclosure.
Figure 17C:
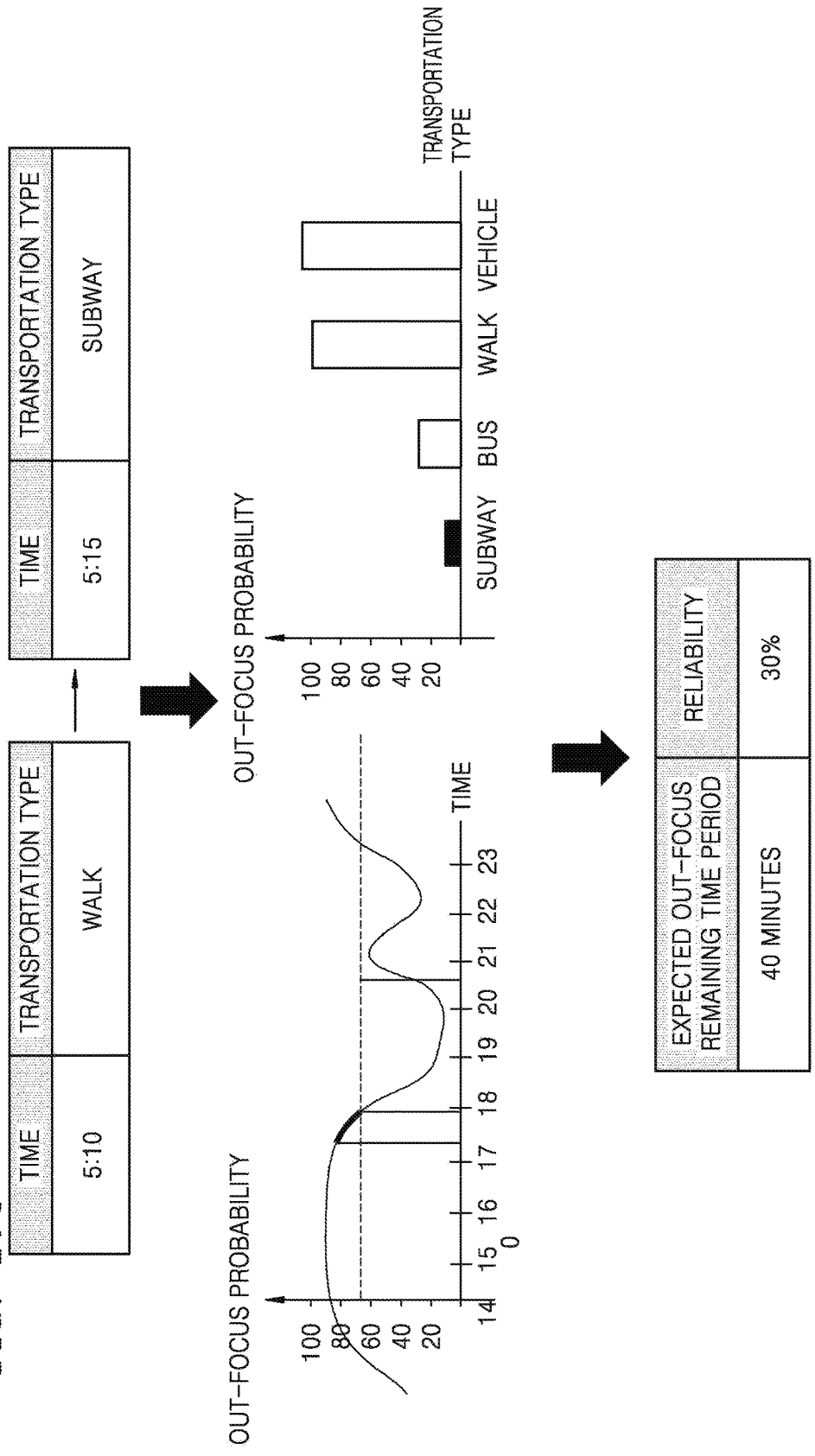

FIGS. 17B and 17C illustrate diagrams related to a method of re-determining reliability of a period in which an out-focus status is to be maintained since a status value of a context of a device is changed, the method being performed by a device, according to various embodiments of the present disclosure.

Referring to FIG. 17B, when a device 100 determines that the out-focus status has started at 5:10 a.m., the device 100 may determine based on information about out-focus probabilities according to time, a time period from 5:10 a.m. to 5:55 a.m. as the period in which the out-focus status is to be maintained.

In this case, the device 100 may calculate reliability of the period in which the out-focus status is to be maintained based on an out-focus probability corresponding to the period in which the out-focus status is to be maintained, and based on a transportation type when the out-focus status has started.

For example, based on 75% that is an average value of out-focus probabilities corresponding to the time period from 5:10 a.m. to 5:55 a.m., and 90% that is an out-focus probability corresponding to a walk that is the transportation type when the out-focus status has started, the device 100 may determine 80% as the reliability of the period in which the out-focus status is to be maintained.

When the reliability of the period in which the out-focus status is to be maintained is equal to or greater than a threshold value, the device 100 may stop an operation of an application that is executed in the device 100.

Referring to FIG. 17C, if the transportation type is changed from the walk to the subway, the device 100 may re-determine, when the transportation type is changed to the subway, the reliability of the period in which the out-focus status is to be maintained.

When a location of the device 100 is changed, the device 100 may determine a transportation type based on the location and a movement speed of the device 100. When the transportation type is changed, the device 100 may re-determine based on an out-focus probability corresponding to a changed transportation type, the reliability of the period in which the out-focus status is to be maintained.

For example, after the operation of the application is stopped and while the out-focus status is maintained, if the transportation type is changed from the walk to the subway, the device 100 may change the reliability of the period in which the out-focus status is to be maintained, to 30% based on 20% that is an out-focus probability corresponding to the subway.

When the reliability of the period in which the out-focus status is to be maintained is changed to 30%, the device 100 may resume the stopped operation of the application.

Therefore, when the location, the status, or the surrounding environment of the device 100 is changed, the device 100 may improve efficiency of power consumption of a battery of the device 100 based on the changed information.

Figure 18:
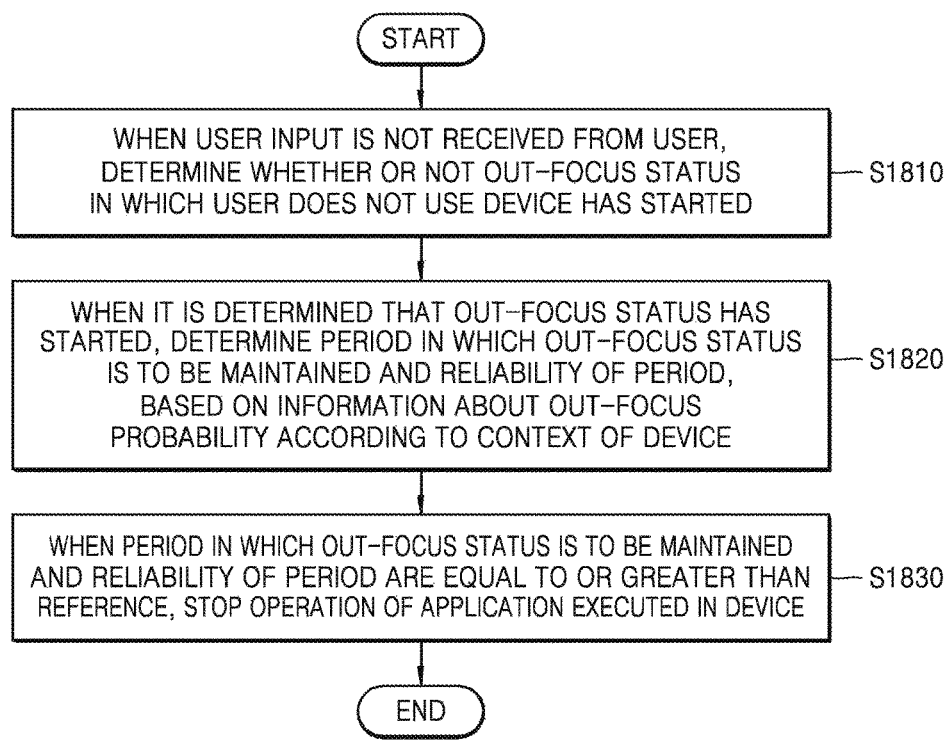
FIG. 18 is a flowchart illustrating a method of stopping an operation of an application executed in the device based on a period in which an out-focus status is to be maintained and reliability of the period, according to an embodiment of the present disclosure.

FIG. 18 is a flowchart illustrating a method of stopping an operation of an application executed in a device based on a period in which an out-focus status is to be maintained and reliability of the period, the method being performed by a device, according to an embodiment of the present disclosure.

Referring to FIG. 18, in operation S1810, when a device 100 does not receive a user input from a user, the device 100 may determine whether or not an out-focus status in which the user does not use the device 100 has started. Operation S1810 may be described with reference to FIGS. 4A through 5.

In operation S1820, when the device 100 determines that the out-focus status has started, the device 100 may determine the period in which the out-focus status is to be maintained and the reliability of the period based on information about an out-focus probability according to a context of the device 100. Operation S1820 may be described with reference to FIGS. 6 through 17C.

In operation S1830, when the period in which the out-focus status is to be maintained and the reliability of the period are equal to or greater than a reference, the device 100 may stop the operation of the application executed in the device 100.

When the period in which the out-focus status is to be maintained is equal to or greater than a reference time period, the device 100 may stop the operation of the application executed in the device 100.

For example, when a background application that exchanges data with a server is executed in the device 100 without the user input, the device 100 may stop the data exchange between the background application and the server.

In this case, if a plurality of background applications are executed in the device 100, the device 100 may sequentially stop background applications which are less used among the plurality of background applications. If the period in which the out-focus status is to be maintained is increased or the reliability of the period is increased, the number of background applications whose operations are stopped by the device 100 may also be increased.

For example, in a case where event information indicating the occurrence of the event is output if a preset event occurs, the device 100 may not output the event information even if the event occurs.

In this case, the device 100 may not output only event information of an event that is from among a plurality of events and whose importance is equal to or less than a preset reference.

The device 100 may determine an event not to be output according to the reliability of the period in which the out-focus status is to be maintained, and may not output only event information of the determined event. The event not to be output according to the reliability of the period in which the out-focus status is to be maintained may be preset in the device 100. For example, when the reliability of the period in which the out-focus status is to be maintained is set high, the device 100 may not output an event with high importance.

For example, in a case where an application is updated without a user input based on updated data received from a server, the device 100 may not receive the updated data from the server. In this case, the device 100 may not receive updated data for only an application whose number of times of use is equal to or less than a reference.

Based on information about an application use pattern of the user, the device 100 may adjust a position, a shape, a size, or a color of an icon of an application according to the context of the device 100, and thus may allow the application which is frequently used according to the context of the device 100, to be more easily found than an application that is not frequently used.

FIG. 19 illustrates a table related to a method of controlling an operation of a background application, the method being performed by a device having an out-focus status, according to an embodiment of the present disclosure.

Referring to FIG. 19, a device 100 may control data exchange of the background application based on a period in which an out-focus status is to be maintained.

The background application may indicate an application that continuously performs a particular function in the device 100 but whose execution is not recognizable by a user.

The background application may be one application or may be a module that forms one application. When the background application is the module that forms one application, the background application may be referred to as a background process or a background service.

For example, the background application may include, but is not limited to, a module configured to periodically monitor particular data via a network, a module configured to periodically receive a rich site summary (RSS) feed from an external server via the network and to parse received extensible mark-up language (XML) data, a module in a social network application configured to periodically exchange data with a server, a module in a location tracking application configured to periodically receive data from a GPS satellite, and a module in a motion recognition application configured to periodically sense a motion of the user.

When the period in which the out-focus status is to be maintained, which is calculated based on the out-focus status according to the context of the device 100, is equal to or greater than 30 minutes, the device 100 may not limit the data exchange of the background application.

When the period in which the out-focus status is to be maintained is equal to or greater than 30 minutes, the device 100 may set as a mode 1, a data exchange control mode of the background application and may not receive data of the background application for 5 minutes and may repeat an operation of receiving and transmitting data for the next 1 minute.

When the period in which the out-focus status is to be maintained is equal to or greater than 5 hours, the device 100 may set as a mode 2, the data exchange control mode of the background application and may not receive data of the background application for 25 minutes and may repeat an operation of receiving and transmitting data for the next 5 minutes.

When the device 100 receives a user input during the period in which the out-focus status is supposed to be maintained, and thus the out-focus status is ended, the device 100 may resume the stopped data exchange.

Accordingly, as the period in which the out-focus status is to be maintained is increased, the number of times the data exchange is performed per hour is decreased, and thus the device 100 may improve efficiency of power consumption of a battery of the device 100.

FIG. 20 illustrates a table related to a method of stopping an operation of an application according to reliability of a period in which an out-focus status is to be maintained, the method being performed by a device, according to an embodiment of the present disclosure.

Referring to FIG. 20, a device 100 may adjust a range of the application whose operation is to be stopped according to the reliability of the period in which the out-focus status is to be maintained.

For example, when the reliability of the period in which the out-focus status is to be maintained is between 60% and 70%, the device 100 may stop data exchange or update of an application whose number of times of execution is between 0% and 20%. When the reliability of the period in which the out-focus status is to be maintained is between 70% and 80%, the device 100 may stop data exchange or update of an application whose number of times of execution is between 0% and 50%. When the reliability of the period in which the out-focus status is to be maintained is between 80% and 99%, the device 100 may stop data exchange or update of an application whose number of times of execution is between 0% and 80%.

Accordingly, when the reliability of the period in which the out-focus status is to be maintained is increased, the number of applications whose operations are stopped by the device 100 is also increased, so that the device 100 may improve efficiency of power consumption of a battery of the device 100.

In an embodiment, the device 100 may adjust, according to a state of a battery of the device 100, a range of an application for which data exchange and update are to be limited. For example, when a remaining power of the battery is high, the device 100 may stop data exchange or update of an application whose number of times of execution is within a range of 0 to 20%. When a remaining power of the battery is neither low nor high, the device 100 may stop data exchange or update of an application whose number of times of execution is within a range of 0 to 50%. When a remaining power of the battery is low, the device 100 may stop data exchange or update of an application whose number of times of execution is within a range of 0 to 80%. When the battery of the device 100 is being charged, the device 100 may not stop data exchange or update of an application.

Accordingly, the lower the remaining power of the battery of the device 100, the more the hourly power consumption of the battery is reduced. For example, while a data exchange cycle of an e-mail is set short, if a remaining power of the battery is low, the device 100 may not receive e-mails. Then, when the remaining power of the battery becomes equal to or greater than a preset reference, the device 100 may receive e-mails from a mail server.

Figure 21:
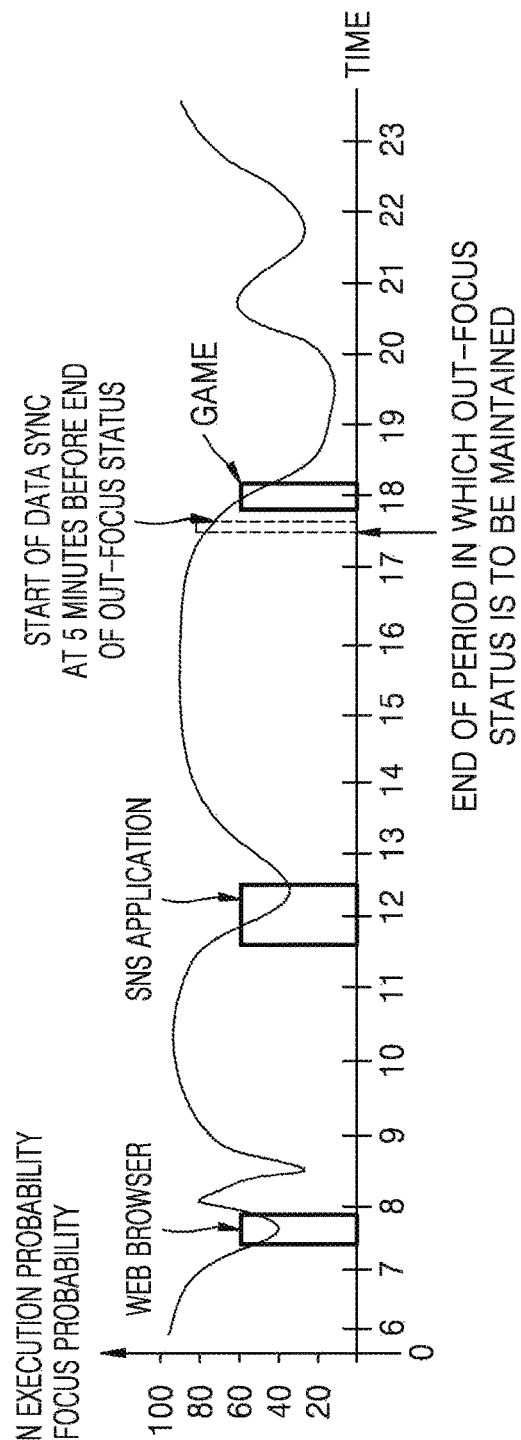
FIG. 21 illustrates a graph related to a method of controlling data exchange of an application based on out-focus probabilities according to time, according to an embodiment of the present disclosure.

FIG. 21 illustrates a graph related to a method of controlling data exchange of an application based on out-focus probabilities according to time, the method being performed by a device, according to an embodiment of the present disclosure.

Referring to FIG. 21, a device 100 may resume a stopped operation of an application before an end of a period in which an out-focus status is to be maintained.

For example, when the out-focus status starts, the device 100 may determine the period in which the out-focus status is to be maintained and may stop data exchange of a background application during the period. After the data exchange of the background application is stopped, the device 100 may calculate a time of the end of the period in which the out-focus status is to be maintained. The device 100 may resume the stopped operation of the application before the end of the period in which the out-focus status is to be maintained. For example, when the time of the end of the period in which the out-focus status is to be maintained is 5:50 p.m., the device 100 may resume the stopped operation of the application at 5:45 p.m.

In this case, before the end of the period in which the out-focus status is to be maintained, the device 100 may consider another context such as a location of the device 100, a status of the device 100, or a surrounding environment of the device 100 and thus may determine whether or not to resume the stopped operation of the application.

For example, when an out-focus probability corresponding to the location of the device 100, an out-focus probability corresponding to the status of the device 100, and an out-focus probability corresponding to the surrounding environment of the device 100 are considered at 5:45 p.m., if the out-focus probabilities are equal to or greater than a reference, the device 100 may not resume the stopped operation of the application and may stop the operation of the application until the device 100 receives a user input or the location, the status, or the surrounding environment is changed.

Based on an application execution probability according to a context of the device 100, the device 100 may resume only an operation of a particular application.

For example, after the end of the period in which the out-focus status is to be maintained, if a probability that a game application is to be executed is equal to or greater than a reference, the device 100 may resume only data exchange and updating with respect to the game application.

For example, at 5 minutes before the end of the period in which the out-focus status is to be maintained, the device may obtain an execution probability of an application corresponding to the location of the device 100. In a case where an execution probability of the game application is highest at 5 minutes before the end of the period in which the out-focus status is to be maintained, the device 100 may resume only the data exchange and the updating with respect to the game application.

Figure 22A:
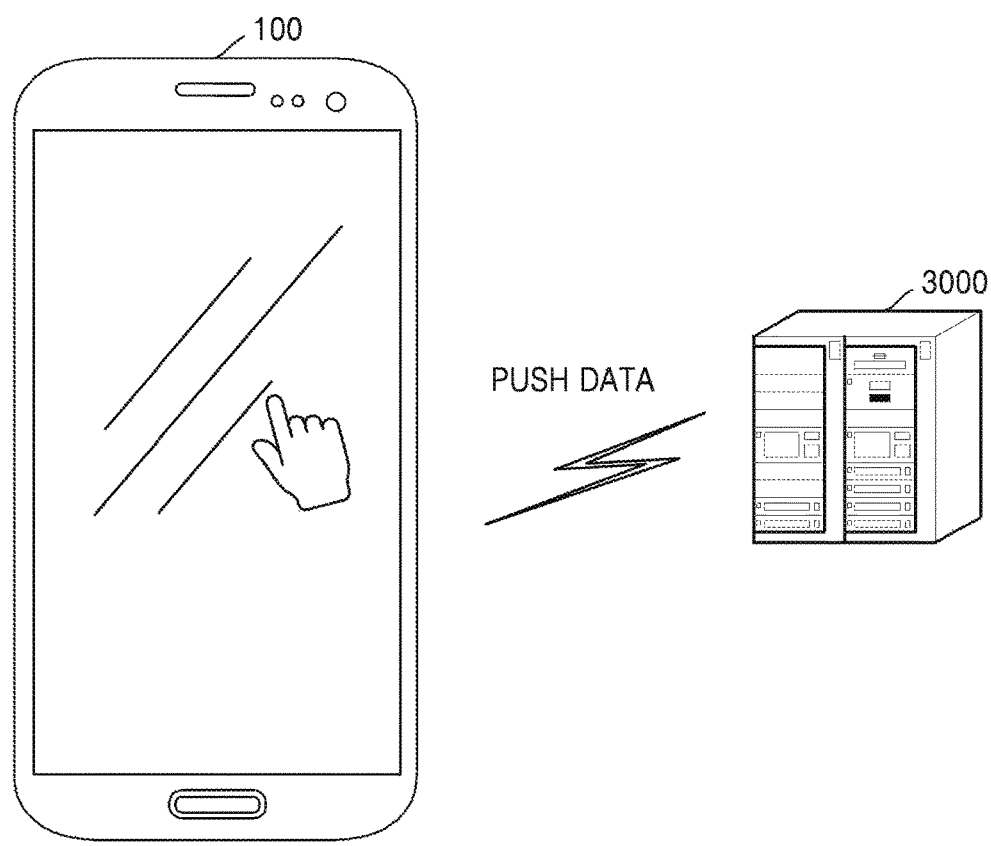
FIGS. 22A and 22B illustrate diagrams related to a method of controlling an event when the event occurs during an out-focus status period, according to various embodiments of the present disclosure.
Figure 22B:

FIGS. 22A and 22B illustrate diagrams related to a method of controlling an event when the event occurs during an out-focus status, the method being performed by a device, according to various embodiments of the present disclosure.

Referring to FIG. 22A, when the event occurs, if a period in which an out-focus status is to be maintained is equal to or greater than a reference time period, or if a probability of the out-focus status is equal to or greater than a reference value, the device 100 may not display information about the event on a screen.

For example, when the device 100 receives push data from a push server 3000 in which identification information of the device 100 was registered, the device 100 may generate an event indicating reception of the push data. In this regard, when the event occurs, if the period in which the out-focus status is to be maintained is equal to or greater than the reference time period or if a probability of the out-focus status is equal to or greater than the reference value, the device 100 may not display information about the generated event. The push data may include, but is not limited to, a text message, an e-mail, or a chat message.

For example, when a user sets an alarm or a schedule in the device 100, the device 100 may generate an alarm event or a schedule event at a set time. In this regard, when the alarm event or the schedule event occurs, if the period in which the out-focus status is to be maintained is equal to or greater than the reference time period or if a probability of the out-focus status is equal to or greater than the reference value, the device 100 may not output information about the alarm event or the schedule event.

Referring to FIG. 22B, during the out-focus status shown in FIG. 22A, if the device 100 receives a user input for cancelling the out-focus status, the device 100 may output event information that was not output.

The user input for cancelling the out-focus status may correspond to an input for touching a screen of the device 100 or pressing a preset button key of the device 100 in a lock status of the device 100.

When the user input for cancelling the out-focus status is received, the device 100 may output the event information by using an output method that was preset in correspondence to an event. For example, when a method of outputting a text message is set in such a manner that content of the text message is displayed on the screen and a vibration notice is output to indicate reception of the text message, the device 100 may display content 2010 of a message on the screen and may generate a vibration.

Accordingly, during the out-focus status when the period in which the out-focus status is to be maintained is equal to or greater than the reference time period or when the event occurs, if the probability of the out-focus status is equal to or greater than the reference value the device 100 may not output the event information and thus may increase efficiency of power consumption of a battery of the device 100.

Figure 23:
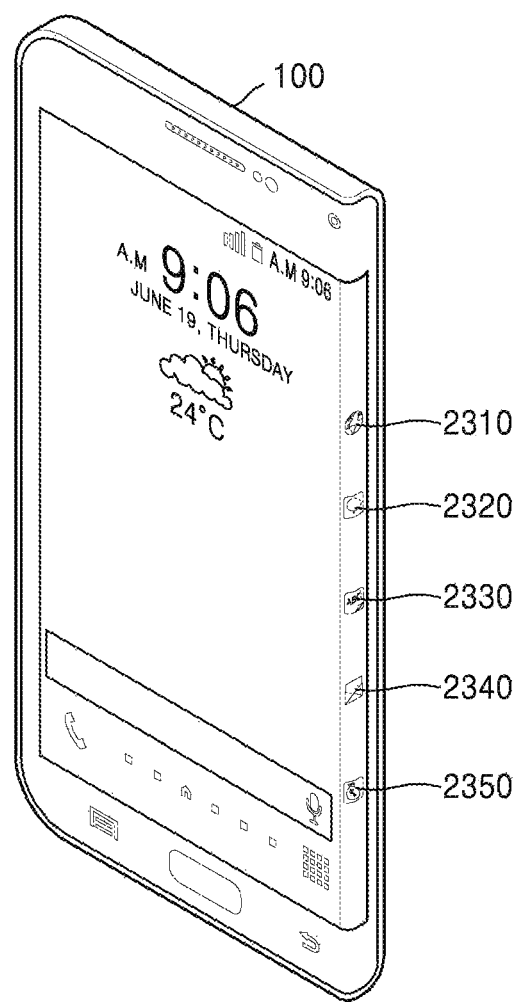
FIG. 23 illustrates a device in relation to a method of displaying identification information of an application based on an execution probability of the application according to a context of the device, according to an embodiment of the present disclosure.

FIG. 23 illustrates a device in relation to a method of displaying identification information of an application based on an execution probability of the application according to a context of the device, the method being performed by a device, according to an embodiment of the present disclosure.

Referring to FIG. 23, a device 100 may display a plurality of pieces of identification information of applications based on execution probabilities of the applications according to the context in order to allow applications having higher execution probabilities to be more easily accessible.

The device 100 may allow the applications having higher execution probabilities to be displayed upward or leftward on the screen, but embodiments are not limited thereto. For example, when execution probabilities of a plurality of applications installed in the device 100 are in descending order of a web browser 2310, a social networking service (SNS) application 2320, a game application 2330, a text application 2340, and a bank application 2350, the device 100 may display icons on an edge screen, which is always accessible to a user, in an order of the web browser 2310, the SNS application 2320, the game application 2330, the text application 2340, and the bank application 2350.

The device 100 may also allow identification information of an application having a high execution probability to be displayed with a high brightness or a high chroma. The device 100 may also allow the identification information of the application having a high execution probability to be further displayed largely. The device 100 may also allow the identification information of the application having a high execution probability to be displayed with an intuitional form, and may allow identification information of an application having a low execution probability to be displayed with an unusual form.

When a status value of the context of the device 100 is changed, the device 100 may obtain execution probabilities of applications corresponding to a changed status value and may display the applications based on the obtained execution probabilities of the applications so that the higher the execution probabilities, the easier the accessibility with respect to the applications.

For example, when a location of the device 100 is changed, the device 100 may obtain execution probabilities of the applications at a changed location and may display the applications, based on the obtained execution probabilities of the applications, so that applications having higher execution probabilities have easier accessibility with respect to other applications.

Figure 24A:
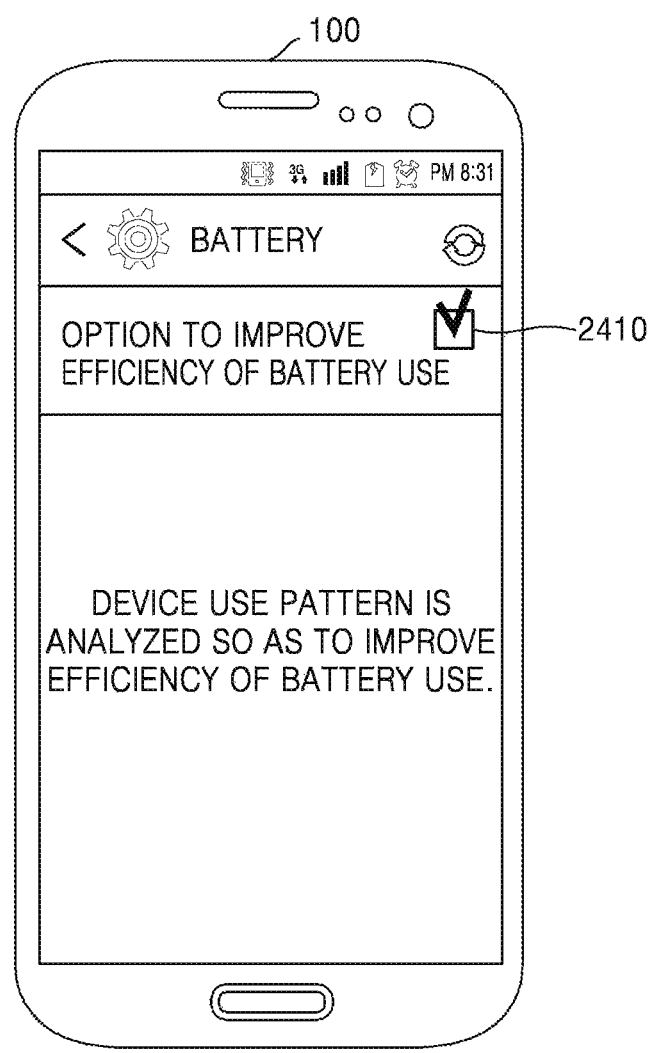
FIGS. 24A and 24B illustrate a device in relation to a method of providing a user interface for controlling an operation of an application based on a use pattern of a user, according to various embodiments of the present disclosure.
Figure 24B:
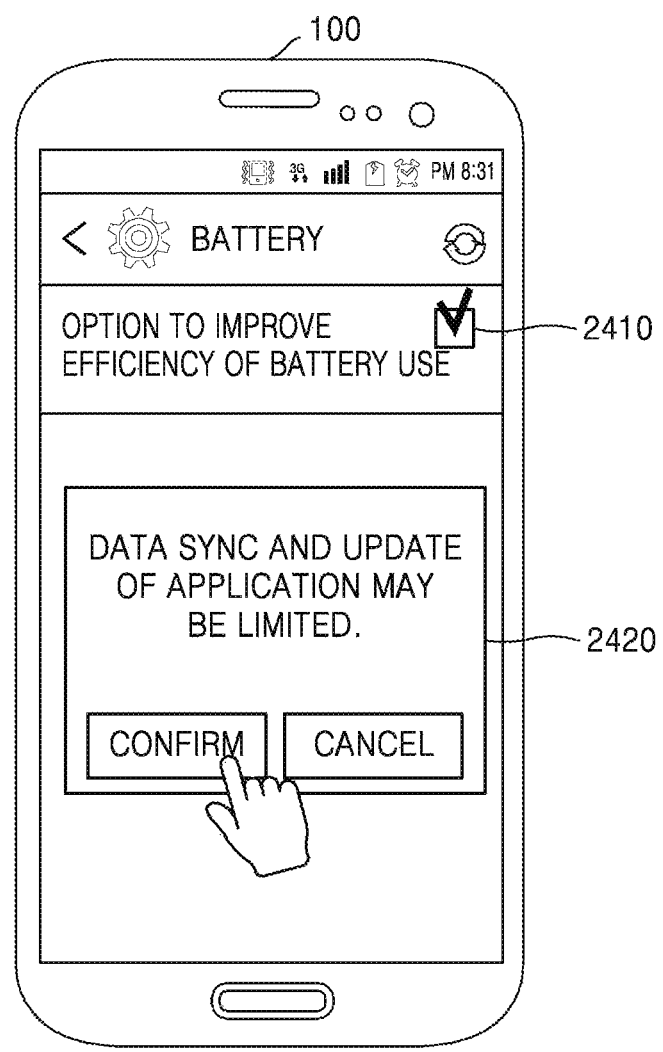

FIGS. 24A and 24B illustrate a device in relation to a method of providing a user interface for controlling an operation of an application based on a use pattern of a user, the method being performed by a device, according to various embodiments of the present disclosure.

Referring to FIG. 24A, a device 100 may provide a menu for controlling the operation of the application based on the use pattern of the user.

When the device 100 receives a user input for selecting the menu for controlling the operation of the application based on the use pattern of the user, the device 100 may display a check-box button 2410 to select whether to execute a function for controlling the operation of the application based on the use pattern of the user.

Referring to FIG. 24B, when the device 100 receives a user input for selecting the check-box button 2410 shown in FIG. 24A, the device 100 may display a selection window 2420 including a description indicating that the operation of the application may be limited.

When the device 100 receives a user input for selecting a confirm button on the selection window 2420, the device 100 may stop the operation of the application based on the use pattern of the user, and thus may increase efficiency of power consumption of a battery of the device 100.

Figure 25:
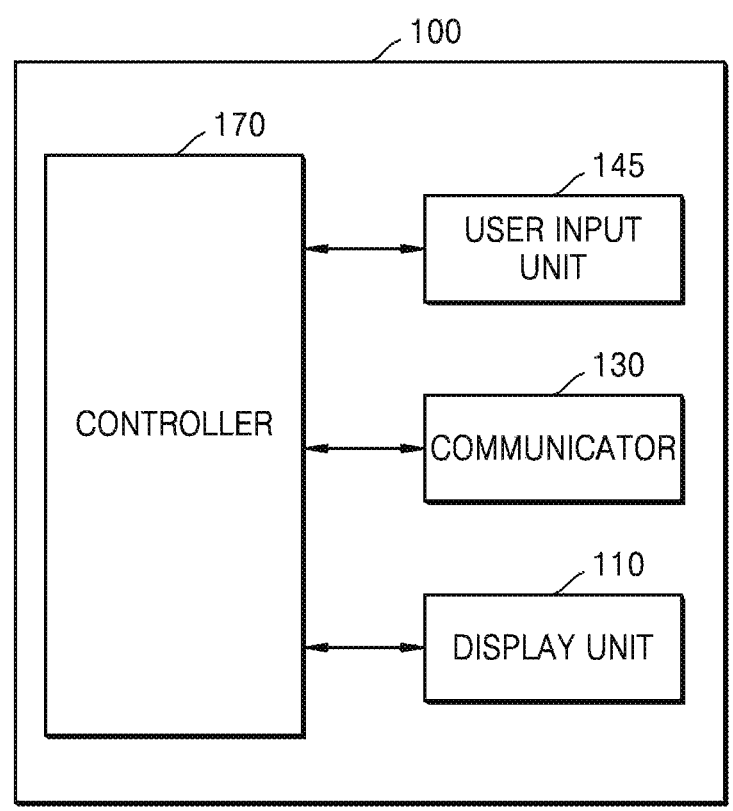
FIG. 25 is a block diagram illustrating a device according to an embodiment of the present disclosure.

FIG. 25 illustrates a block diagram of a device according to an embodiment of the present disclosure.

Referring to FIG. 25, a device 100 may include a user input unit 145, a communicator 130, a display unit 110, and a controller 170. However, not all elements shown in FIG. 25 are necessary elements. That is, the device 100 may be embodied with more or less elements than the elements shown in FIG. 25.

The user input unit 145 may receive an input from a user.

The user input unit 145 may receive a user input from the user after an operation of an application is stopped during an out-focus status.

The communicator 130 may exchange data with a peripheral device or a server.

The communicator 130 may exchange data of a background application with the server. Accordingly, even if a user input is not received, the communicator 130 may exchange data with respect to an application with the server.

The communicator 130 may receive updated data with respect to the application from the server. Therefore, even if a user input is not received, the communicator 130 may receive the updated data with respect to the application from the server.

The communicator 130 may receive a call connection request from a telephone network server.

The display unit 110 may display information.

When the call connection request is received, the display unit 110 may output information indicating reception of the call connection request.

The controller 170 may control a configuration of the device 100 including the user input unit 145, the communicator 130, and the display unit 110.

When a user input is not received, the controller 170 may determine whether an out-focus status in which the user does not use the device 100 has started.

For example, when the user input is not received during at least a preset time period, the controller 170 may inactivate the display unit 110. When the display unit 110 is inactivated, the controller 170 may determine that the out-focus status has started.

For example, when a user input for confirming the call connection request in response to output event information is not received, the controller 170 may determine that the out-focus status has started.

When the controller 170 determines that the out-focus status has started, the controller 170 may determine a period in which the out-focus status is to be maintained based on a probability of the out-focus status according to a context of the device 100.

For example, the controller 170 may determine the period in which the out-focus status is to be maintained based on a value of a probability of the out-focus status corresponding to a time period after the out-focus status has started, wherein the value of the probability is from among information about out-focus probabilities according to time.

When the determined period in which the out-focus status is to be maintained is equal to or greater than a reference time period, the controller 170 may stop an operation of an application executed in the device 100.

The controller 170 may determine reliability of the period in which the out-focus status is to be maintained based on information about a device use pattern of the user and when the reliability of the period in which the out-focus status is to be maintained is equal to or greater than a reference, the controller 170 may stop the operation of the application executed in the device 100.

For example, the controller 170 may determine the reliability of the period in which the out-focus status is to be maintained based on a probability value corresponding to a location of the device 100 when the out-focus status has started, wherein the probability value is from among information about probabilities of the out-focus status according to locations of the device 100.

As another example, the controller 170 may determine the reliability of the period in which the out-focus status is to be maintained based on a probability value corresponding to a status of the device 100 when the out-focus status has started, wherein the probability value is from among information about probabilities of the out-focus status according to statuses of the device 100.

When the period in which the out-focus status is to be maintained is equal to or greater than the reference time period, the controller 170 may control the communicator 130 to stop data exchange of the background application.

When the period in which the out-focus status is to be maintained is equal to or greater than the reference time period, the controller 170 may control the communicator 130 not to receive updated data with respect to the application from the server.

When the period in which the out-focus status is to be maintained is equal to or greater than the reference time period, even if information about an event is received from the server, the controller 170 may not request the display unit 110 to output information indicating reception of the event.

When a user input is received from the user, the controller 170 may resume the stopped operation of the application.

The device 100 may include an output unit. The output unit may output information to a user. For example, the output unit may include the display unit 110 or a speaker 160 shown in FIG. 26.

A configuration of a device 100 may be applied to various types of devices such as a mobile phone, a tablet PC, a personal digital assistant (PDA), a Moving Picture Experts Group phase 1 or phase 2 (MPEG-1 or MPEG-2) audio layer 3 (MP3) player, a kiosk, an electronic photoframe, a navigation device, a digital television (TV), a smart watch, a wristwatch, or a wearable device such as smart glasses, head-mounted display (HMD), or the like.

Referring again to FIG. 26, a device 100 may include the communicator 130, the user input unit 145, the display unit 110, and the controller 170, and may further include at least one of a memory 120, a GPS chip 125, a video processor 135, an audio processor 140, a microphone 150, an image-capturing unit 155, a speaker 160, a motion detector 165, and the battery 180.

The display unit 110 may include a display panel 111 and a controller (not shown) that controls the display panel 111.

The display panel 111 may be embodied as various displays including a liquid crystal display (LCD) display, an organic light-emitting diode (OLED) display, an active matrix OLED (AMOLED) display, a plasma display panel (PDP), or the like. The display panel 111 may be formed to be flexible, transparent, impact resistant, and/or wearable. The display panel 111 may be combined with a touch panel 147 of the user input unit 145, and thus may be provided as a touchscreen (not shown). For example, the touchscreen may include an integrated module having a stack structure containing the display panel 111 and the touch panel 147.

The memory 120 may include at least one of an internal memory (not shown) and an external memory (not shown).

The internal memory may include at least one of a volatile memory (e.g., a dynamic RAM (DRAM), a static RAM (SRAM), a synchronous DRAM (SDRAM), etc.), a non-volatile memory (e.g., a one-time programmable read-only memory (OTPROM), a PROM, an erasable and programmable ROM (EPROM), an electrically erasable and programmable ROM (EEPROM), a mask ROM, a flash ROM, etc.), a hard disk drive (HDD), and a solid-state drive (SSD). According to an embodiment, the controller 170 may load a command or data, which is received from at least one of the non-volatile memory and another element, to the volatile memory, and may process the command or the data. Also, the controller 170 may store, in the non-volatile memory, data that is received from or is generated by another element.

The external memory may include at least one of a compact flash (CF) memory, a secure digital (SD) memory, a micro-SD memory, a mini-SD memory, an extreme digital (xD) memory, and a memory stick.

The memory 120 may store various programs and data used in operations of the device 100. For example, the memory 120 may temporarily or semi-permanently store a portion of contents to be displayed on a lock screen.

The controller 170 may control the display unit 110 to display a portion of contents which is stored in the memory 120. That is, the controller 170 may display, on the display unit 110, the portion of the contents which is stored in the memory 120. Alternatively, when a user's gesture is performed in a region of the display unit 110, the controller 170 may perform a control operation that corresponds to the user's gesture.

The controller 170 may include at least one of a RAM 171, a ROM 172, a central processing unit (CPU) 173, a graphics processing unit (GPU) 174, and a bus 175. The RAM 171, the ROM 172, the CPU 173, and the GPU 174 may be connected to each other via the bus 175.

The CPU 173 accesses the memory 120, and performs a booting operation by using an operating system (O/S) stored in the memory 120. Also, the CPU 173 performs various operations by using the various programs, a plurality of items of content, a plurality of items of data, etc. which are stored in the memory 120.

The ROM 172 stores a command set for booting up a system. For example, when a turn-on command is input to the device 100, and power is supplied to the device 100, the CPU 173 may copy the operating system stored in the memory 120 to the RAM 171, according to the command stored in the ROM 172, may execute the operating system, and thus may boot up the system. When the booting operation is completed, the CPU 173 copies the various programs stored in the memory 120 to the RAM 171, and performs the various operations by executing the programs copied to the RAM 171. When the device 100 is booted up, the GPU 174 displays a user interface screen in a region of the display unit 110. In more detail, the GPU 174 may generate a screen that displays an electronic document including various objects such as content, an icon, a menu, or the like. The GPU 174 calculates coordinate values of the objects that are to be displayed according to a layout of the user interface screen, and calculates attribute values of shapes, sizes, or colors of the objects. Then, the GPU 174 may generate user interface screens with various layouts including the objects based on the calculated attribute values. The user interface screen generated by the GPU 174 may be provided to the display unit 110 and thus may be displayed in areas of the display unit 110.

The GPS chip 125 may receive a GPS signal from a GPS satellite and may calculate a current position of the device 100. In a case where a navigation program is used or a current position of the user is required, the controller 170 may calculate a position of the user by using the GPS chip 125.

The communicator 130 may communicate with various external devices according to various types of communication methods. The communicator 130 may include at least one of a Wi-Fi chip 131, a Bluetooth chip 132, a wireless communication chip 133, and a near field communication (NFC) chip 134. The controller 170 may communicate with the various external devices by using the communicator 130.

The Wi-Fi chip 131 and the Bluetooth chip 132 may perform communication by using Wi-Fi and Bluetooth, respectively. If the Wi-Fi chip 131 or the Bluetooth chip 132 is used, the Wi-Fi chip 131 or the Bluetooth chip 132 may first transmit and receive various types of connection information including a service set identification (SSID), a session key, or the like, may establish a connection for communication by using the connection information, and then may transmit and receive various types of information. The wireless communication chip 133 may indicate a chip that performs communication according to various communication standards such as the Institute of Electrical and Electronics Engineers (IEEE), ZigBee, $3^{rd}$ generation (3G), 3G Partnership Project (3GPP), long term evolution (LTE), or the like. The NFC chip 134 indicates a chip that operates using NFC by using a 13.56 MHz band from among various radio frequency-identification (RF-ID) frequency bands such as 135 kHz, 13.56 MHz, 433 MHz, 860 through 960 MHz, 2.45 GHz, or the like.

The video processor 135 may process video data included in content received by using the communicator 130 or may process video data included in content stored in the memory 120. The video processor 135 may perform various image processing such as decoding, scaling, noise filtering, frame rate conversion, resolution conversion, or the like on the video data.

The audio processor 140 may process audio data included in content received by using the communicator 130 or may process audio data included in content stored in the memory 120. The audio processor 140 may perform various processing such as decoding, amplification, noise filtering, or the like on the audio data.

When a reproducing program for multimedia content is executed, the controller 170 may reproduce the multimedia content by driving the video processor 135 and the audio processor 140. The speaker 160 may output audio data generated in the audio processor 140.

The user input unit 145 may receive an input of various instructions from a user. The user input unit 145 may include at least one of a key 146, the touch panel 147, and a pen recognizing panel 148.

The key 146 may be of various types such as a mechanical button, a wheel, or the like that may be formed in a front portion, a side portion, a rear portion, etc., of an external surface of a body of the device 100.

The touch panel 147 may sense a touch input by the user and may output a value of a touch event that corresponds to a signal generated by the sensed touch input. When the touch panel 147 is combined with the display panel 111 and thus is formed as a touchscreen, the touchscreen may be configured as a capacitive touchscreen, a resistive touchscreen, or a piezoelectric touchscreen by using various types of touch sensors. The capacitive touchscreen may calculate touch coordinates by sensing a small amount of electricity generated when a body part of the user touches the surface of the capacitive touchscreen, which is coated with a dielectric material. The resistive touchscreen may include two embedded electrode plates and may calculate touch coordinates by sensing a flow of current that occurs when the user touches the resistive touchscreen which causes upper and lower plates of a touched point to contact each other. The touch event that occurs on the touchscreen may be mainly generated by a finger of a person but may also be generated by an object formed of a conductive material capable of changing capacitance.

The pen recognizing panel 148 may sense a proximity input or a touch input of a touch pen (e.g., a stylus pen or a digitizer pen) which is performed by a user, and may output a sensed pen proximity event or a sensed pen touch event. The pen recognizing panel 148 may be an electromagnetic resonance (EMR)-type pen recognizing panel, and may sense the touch input or the proximity input according to changes in a strength of an electromagnetic field, which occur when the touch pen approaches or touches the touchscreen. In more detail, the pen recognizing panel 148 may include an electromagnetic induction coil sensor (not shown) having a grid structure, and an electric signal processor (not shown) for sequentially providing an alternating current (AC) signal having a predetermined frequency to each loop coil of the electromagnetic induction coil sensor. When a pen having an internal resonance circuit is positioned near a loop coil of the pen recognizing panel 148, a magnetic field transmitted from the loop coil generates a current in the resonance circuit in the pen, based on mutual electrostatic induction. Due to the current, an induction field is generated from a coil forming the resonance circuit in the pen, and the pen recognizing panel 148 detects the induction field from the loop coil capable of receiving a signal, and thus senses the touch input or the proximity input by the pen. The pen recognizing panel 148 may be arranged to occupy a preset area below the display panel 111, e.g., may have a size capable of covering a display region of the display panel 111.

The microphone 150 may receive an input of a user's voice or other sound and may convert the user's voice or other sound to audio data. The controller 170 may use the user's voice, which is input via the microphone 150, in a call-related operation or may convert the user's voice to the audio data and may store the audio data in the memory 120.

The image-capturing unit 155 may capture a still image or a moving picture according to a control by the user. The image-capturing unit 155 may be plural in number and include a front camera, a rear camera, or combinations thereof.

If the image-capturing unit 155 and the microphone 150 are formed together, the controller 170 may perform a control operation according to a user's voice input via the microphone 150 or a user's motion recognized by the image-capturing unit 155. For example, the device 100 may operate in a motion control mode or a voice control mode.

If the device 100 operates in the motion control mode, the controller 170 may activate the image-capturing unit 155 and may capture an image of the user, may trace a change in motions of the user, and may perform a control operation corresponding thereto. If the device 100 operates in the voice control mode (i.e., a voice recognition mode), the controller 170 may analyze a user's voice input via the microphone 150, and may perform a control operation according to the analyzed user's voice.

The motion detector 165 may detect movement of a body of the device 100. The device 100 may rotate or may tilt in various directions. Here, the motion detector 165 may detect a movement characteristic such as a rotation direction, a rotation angle, a tilted angle, or the like by using at least one of various sensors including a magnetic sensor, a gyroscope sensor, an acceleration sensor, etc.

Although not illustrated in FIG. 26, the present embodiment may further include a universal serial bus (USB) port for connecting the device 100 and a USB connector, various external input ports including a headset, a mouse, a local area network (LAN), etc. for connection with various external terminals, a digital multimedia broadcasting (DMB) chip for receiving and processing a DMB signal, various sensors, or the like.

Names of the elements of the device 100 may be changed. Also, the device 100 according to the present embodiment may be embodied by including at least one of the elements, or may be embodied with more or less elements than the elements.

The various embodiments may be embodied as computer readable code/instructions on a recording medium, e.g., a program module to be executed in computers, which include computer-readable commands. The computer storage medium may include any usable medium that may be accessed by computers, volatile and non-volatile medium, and detachable and non-detachable medium. Also, the computer storage medium may include a computer storage medium and a communication medium. The computer storage medium includes all volatile and non-volatile media, and detachable and non-detachable media which are technically implemented to store information including computer readable commands, data structures, program modules or other data. The communication medium includes computer-readable commands, a data structure, a program module, other data as modulation-type data signals such as carrier signals, or other transmission mechanism, and includes other information transmission mediums.

It should be understood that the various embodiments described herein should be considered in a descriptive sense only and not for purposes of limitation. Descriptions of features or aspects within each embodiment should typically be considered as available for other similar features or aspects in other embodiments. For example, configuring elements that are singular forms may be executed in a distributed fashion, and also, configuring elements that are distributed may be combined and then executed.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A device comprising:
    a touch screen; and
    at least one processor configured to at least:

when a user input is not received for a preset time period via the touch screen, turn off the touch screen and determine that an out-focus status in which the user does not use the device has started, based on both the out-focus status being started and a current context of the device, identify a probability of the out-focus status being maintained, based on the identified probability of the out-focus status being maintained, calculate an expected period in which the out-focus status is to be maintained from when the out-focus status has started, and based on both the out-focus status being started and the expected period being equal to or greater than a reference time period, stop an operation of an application which is being executed in a background on the device.

2. The device of claim 1, wherein the out-focus status in which the user does not use the device indicates at least one of a status in which the touch screen does not output the information or a status in which the user does not receive the information output from the touch screen.

3. The device of claim 1, wherein the context of the device comprises at least one of a time, a location of the device, a status of the device, or an environment surrounding the location of the device.

4. The device of claim 1,
wherein, after the application is stopped, the at least one processor is further configured to receive the user input via the touch screen from the user, and
wherein, when the user input is received from the user, the at least one processor is further configured to resume the stopped application.

5. The device of claim 1, further comprising:
a transceiver configured to receive a call connection request from a server,
wherein, when the call connection request is received, the at least one processor is further configured to control the touch screen to output information indicating reception of the call connection request, and
wherein, when a user input for confirming the call connection request in response to the output information is not received, the at least one processor is further configured to determine that the out-focus status has started.

6. The device of claim 5, wherein the at least one processor is further configured to:
determine the expected period in which the out-focus status is to be maintained, based on a value of a probability of the out-focus status corresponding to a time period after the out-focus status has started,
wherein the value of the probability is obtained from among information about probabilities of the out-focus status according to time.

7. The device of claim 1,
wherein the at least one processor is further configured to determine reliability of the expected period in which the out-focus status is to be maintained based on information about the probability of the out-focus status according to the context of the device, and
wherein, when the reliability of the expected period in which the out-focus status is to be maintained is equal to or greater than a reference, the at least one processor is further configured to stop the application executed in the background on the device.

8. The device of claim 7,
wherein the information about the probability of the out-focus status according to the context of the device comprises information about probabilities of the out-focus status according to locations of the device,
wherein the at least one processor is further configured to determine the reliability of the expected period in which the out-focus status is to be maintained based on a probability value corresponding to a location of the device when the out-focus status has started, and
wherein the probability value is obtained from among the information about the probabilities of the out-focus status according to the locations of the device.

9. The device of claim 7,
wherein the information about the probability of the out-focus status according to the context of the device comprises information about probabilities of the out-focus status according to statuses of the device,
wherein the at least one processor is further configured to determine the reliability of the expected period in which the out-focus status is to be maintained based on a probability value corresponding to a status of the device when the out-focus status has started, and
wherein the probability value is obtained from among the information about the probabilities of the out-focus status according to the statuses of the device.

10. The device of claim 1, further comprising:
a transceiver configured to exchange data about the application with the server, even if the user input is not received,
wherein, when the expected period in which the out-focus status is to be maintained is equal to or greater than the reference time period, the at least one processor is further configured to control the transceiver to stop exchanging the data.

11. The device of claim 10, wherein, even if information about an event is received from a server, the at least one processor is further configured not to request the transceiver to output information indicating reception of the event when the expected period in which the out-focus status is to be maintained is equal to or greater than the reference time period.

12. The device of claim 1, further comprising:
a transceiver configured to receive updated data with respect to the application from a server even if the user input is not received,
wherein, when the expected period in which the out-focus status is to be maintained is equal to or greater than the reference time period, the at least one processor is further configured to control the transceiver not to receive the updated data from the server.

13. A method of managing power comprising:
when a user input is not received from a user for a preset time period via a touch screen, turning off the touch screen and determining that an out-focus status in which the user does not use the device has started;
based on both the out-focus status being started and a current context of the device, identifying a probability of the out-focus status being maintained,
based on the identified probability of the out-focus status being maintained, calculating an expected period in which the out-focus status is to be maintained from when the out-focus status has started; and
based on both the out-focus status being started and the expected period being equal to or greater than a reference time period, stopping an operation of an application which is being executed in a background on the device.

14. The method of claim 13, wherein the out-focus status in which the user does not use the device, indicates at least one of a status in which the touch screen of the device does not output information or a status in which the user does not receive the information output from the touch screen of the device.

15. The method of claim 13, wherein the context of the device comprises at least one of a time, a location of the device, a status of the device, or an environment surrounding the location of the device.

16. The method of claim 13, further comprising:
   after the application is stopped, receiving the user input via the touch screen from the user; and
   when the user input is received from the user, resuming the stopped application.

17. The method of claim 13, further comprising:
   when a call connection request is received from a server, outputting information indicating reception of the call connection request,
   wherein, when a user input for confirming the call connection request in response to the output information is not received, the determining of the out-focus status comprises determining that the out-focus status has started.

18. A non-transitory computer-readable recording medium having recorded thereon one or more computer programs including instructions that, when executed by at least one processor, cause the at least one processor to control for executing the method according to claim 13.

\* \* \* \* \*